United States Patent
Yokoe

(10) Patent No.: US 6,553,501 B1
(45) Date of Patent: Apr. 22, 2003

(54) PREDICTIVE POWER SAVING METHOD AND APPARATUS FOR A DEVICE BASED ON COMPUTED AMOUNT OF POWER SAVING AND TIME AT WHICH THE DEVICE SHOULD TRANSITION FROM FIRST STATE TO SECOND STATE

(75) Inventor: Yuji Yokoe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,161

(22) Filed: Nov. 24, 1999

(30) Foreign Application Priority Data

Nov. 27, 1998 (JP) .............................................. 10-337003

(51) Int. Cl.[7] .............................. G06F 1/26; G06F 1/32
(52) U.S. Cl. ....................................... 713/320; 713/321
(58) Field of Search .................................. 713/320, 321

(56) References Cited

U.S. PATENT DOCUMENTS

| | | | | |
|---|---|---|---|---|
| 5,452,277 A | | 9/1995 | Bajorek et al. ................ 369/54 |
| 5,481,733 A | * | 1/1996 | Douglis et al. .............. 713/321 |
| 5,493,670 A | | 2/1996 | Douglis et al. .............. 395/750 |
| 5,774,292 A | * | 6/1998 | Georgiou et al. .............. 360/63 |

FOREIGN PATENT DOCUMENTS

| | | | |
|---|---|---|---|
| EP | 0737909 A2 | 10/1996 | ............. G06F/1/32 |
| EP | 0751512 A2 | 1/1997 | ........... G11B/19/00 |
| JP | 60-171672 | 9/1985 | ........... G11B/19/02 |
| JP | 3-49660 | 5/1991 | ........... G11B/19/00 |
| JP | 04-006665 | 1/1992 | ........... G11B/19/00 |
| JP | 04-011353 | 1/1992 | ........... G11B/19/00 |
| JP | 04-023269 | 1/1992 | ........... G11B/19/00 |
| JP | 04-092254 | 3/1992 | ........... G11B/19/00 |
| JP | 04-123359 | 4/1992 | ........... G11B/19/00 |
| JP | 04-205963 | 7/1992 | ........... G11B/19/00 |
| JP | 05-217272 | 8/1993 | ........... G11B/19/00 |
| JP | 06-096517 | 4/1994 | ........... G11B/19/20 |
| JP | 07-210975 | 8/1995 | ........... G11B/19/00 |
| JP | 07-334913 | 12/1995 | ........... G11B/19/00 |
| JP | 08-087383 | 4/1996 | ........... G11B/19/00 |
| JP | 08-287583 | 11/1996 | ........... G11B/19/00 |
| JP | 09-017099 | 1/1997 | ........... G11B/19/00 |

OTHER PUBLICATIONS

IBM TDB; Power Savings Using Predictive Usage Methods; Jul., 1998; IBM Corporation; IBM RD v41 n411 07–98 article 411130 Order: 98A 60476.*

* cited by examiner

Primary Examiner—Thomas Lee
Assistant Examiner—Suresh K Suryawanshi
(74) Attorney, Agent, or Firm—Randall J. Bluestone; Robert B. Martin; Lewis L. Nunnelley

(57) ABSTRACT

A system which reduces power dissipation in a data storage device having a normal operating mode and at least one power saving mode by computing a predicted amount of power that would be saved by the device if the device makes a transition from the normal operating mode to the power saving mode; computing a time at which the device should transition from the normal operating mode to the power saving mode, based on at least one predicted amount of power to be saved; and transitioning the device from the normal operating mode to the power saving mode.

2 Claims, 21 Drawing Sheets

PREDICTIVE POWER SAVING METHOD AND APPARATUS FOR A DEVICE BASED ON COMPUTED AMOUNT OF POWER SAVING AND TIME AT WHICH THE DEVICE SHOULD TRANSITION FROM FIRST STATE TO SECOND STATE

BACKGROUND OF THE INVENTION

1. Field of the Invention

The present invention relates to the management of electric power to be supplied to a disk storage device, and more particularly to a method of reducing power dissipation.

2. Background Art

Making the power dissipation of electronic equipment such as personal computers (PCs) even smaller is important to further environmental protection efforts. Particularly, for portable equipment such as notebook type PCs, even a further saving of power has been demanded in order to make long use possible by an incorporated power source.

The hard-disk drive (HDD), employed as a storage device for these pieces of equipment, has an idle mode in which a track following operation is performed but no read or write operations are performed, in addition to an active mode in which no operation is performed for power saving, in order to reduce power dissipation. To further reduce power dissipation, the HDD also has a plurality of power saving modes, such as a standby mode in which a spindle motor for spinning the disk stands by.

To reduce power dissipation on average, it is effective to make a transition to a power saving mode of as low a level (less power dissipation) as possible during non-operation in which there is no command from a host computer.

On the other hand, to prevent the time to respond to a command from the host computer from becoming long, there is a need to return from the power saving mode to the active mode as soon as the command is received.

In general, more time and power become necessary when making a transition to a power saving mode of a lower level or when returning to the active mode.

Therefore, in the case where the interval to receive a command is short and the non-operating time is short, a determination should be made whether the power that will be dissipated by making a transition to the power saving mode will be greater than the power that can be saved by entering that power saving mode and as a result will actually the average power dissipation of the HDD. In addition, the response to the command will be delayed by a time to return to the active mode.

For such reasons, there is a need to optimize the timing for entering the power saving mode. The following methods have been considered for that purpose.

(1) Control Method by a Simple Timer:

In this method, when more than a constant time has elapsed since a command was executed just before, it is judged that the next command will not come for a while, and a transition to the power saving mode is made. The "constant time" here means times respectively corresponding to a fixed value and a value specified by a command from the host computer.

However, in this method, when the interval between commands is slightly longer than the above-mentioned constant time, for example, the next command comes immediately after the power saving mode. For this reason, this method returns to the active mode, and consequently, there are cases where average power dissipation is increased.

(2) Adaptive Battery Life Extender (ABLE) Method:

In this method, at intervals of the past constant time, the number (density) of commands that the HDD received within that time is checked. In the case where the density of the commands received within the constant time is high, the time to make a transition to the power saving mode is shortened. In the case where the density of the commands is low (the interval between the commands is long), the time to make a transition to the power saving mode is lengthened.

With this method, in the case where the HDD receives commands at constant intervals, the possibility of the next command coming immediately after an entry of the power saving mode can be reduced. However, in the case where the interval between commands changes at random, a transition to the power saving mode cannot be always made at optimum timing. Also, since the timing to make a transition to the power saving mode is determined based on the density of commands with the time, at which a command was received, as a reference, the apparent density will be reduced in the case where the time for the HDD to process a command is long, and consequently, there is a possibility that a transition to the power saving mode will be made at improper timing.

(3) Enhanced Adaptive Battery Life Extender (ABLE2) Method

This method is an expansion of the ABLE method in subsection (2). That is, the power saving mode to be controlled by the ABLE method is only one, but this number is increased to three. Furthermore, this method also makes it possible to automatically make a transition to a power saving mode of a lower level (e.g., in an HDD equipped with a loading/unloading mode, a mode of unloading the read/write head).

The timing to make a transition to another power saving mode is identical in this method identical and the ABLE method. However, ABLE2 differs from the ABLE method in that ABLE2 defines three kinds of functions, depending upon a pattern of command intervals (i.e., a case of receiving commands at constant intervals, a case that does not receive a command for a while after the first command has been received, and a case of receiving commands at random intervals) and thereby makes a transition from an active mode to a power saving mode, or from a power saving mode to another mode, at timing as good as possible.

Problems with these prior art systems include that they do not calculate the electric power dissipation that is expected to be saved in a transition to the power saving mode. Therefore, in conventional systems, the additional electric power that is dissipated for a transition to a power saving mode or a return from the power saving mode and the electric power dissipated for the delayed time of command response can be greater than the electric power dissipation to be saved during the transition to the power saving mode, depending upon the command interval and the timing to make a transition to the power saving mode. Consequently, there are cases where the object of saving power is not achieved.

Also, the density of commands is calculated with the time at which a command was received as a reference. Therefore, in the case where an HDD takes time to process a command, it is late in providing the command completion signal and accordingly the host computer issues the next command late. For this reason, although the non-operating time of the HDD is short (i.e., although the rate of operation is high), the apparent density of commands that are received from the host computer is reduced, and consequently, there is a possibility that a transition to the power saving mode will be made at improper times.

SUMMARY OF THE INVENTION

It is an object of the present invention to further reduce the power dissipation of a HDD.

Another object of the invention is to provide a method and a system that are capable of computing the electric power dissipation that is expected to be saved when a transition to the power saving mode is made.

Still another object of the invention is to provide a method and a system that calculate the density of commands that a HDD receives from a host computer truly in accordance with the non-operating time of the HDD, while overcoming the above-mentioned disadvantage that, although the non-operating time of the HDD is short, the apparent density of commands to be received from the host computer is reduced and therefore a transition to the power saving mode is made at improper timing.

According to the present invention, the electric power dissipation additionally required for a transition to a power saving mode and a return from the power saving mode and the electric power dissipation equivalent to the amount of a response delay time with respect to a command are previously compared with the electric power dissipation that is expected to be saved during a transition to the power saving mode.

Also, according to the present invention, it is supposed that the next command comes with the same time distribution as the time distribution of past command intervals to the HDD. The electric power dissipation, which is expected to be saved when the HDD makes a transition to the power saving mode, is calculated at a plurality of times.

In addition, according to the present invention, an average delay time for returning from the power saving mode in order to execute the next command is calculated along with the electric power dissipation that is expected to be saved.

Furthermore, according to the present invention, within a range where the above-mentioned calculated average delay time is shorter than a time specified by a host computer, a transition to the power saving mode is made at times when the amount of electric power dissipation that can be saved is greatest.

Moreover, according to the present invention, the past command interval employed in calculations employs the time between completion of the execution of the previous command and reception of the next command, not the time between reception of the previous command and reception of the next command. Namely, the time when interface is not operated (idle state) is regarded as command interval.

Finally, according to the present invention, the influence of the past command interval that is employed in calculations is reduced by half at intervals of a constant time so that the latest access pattern is reflected most significantly in the calculations.

Figure 1:
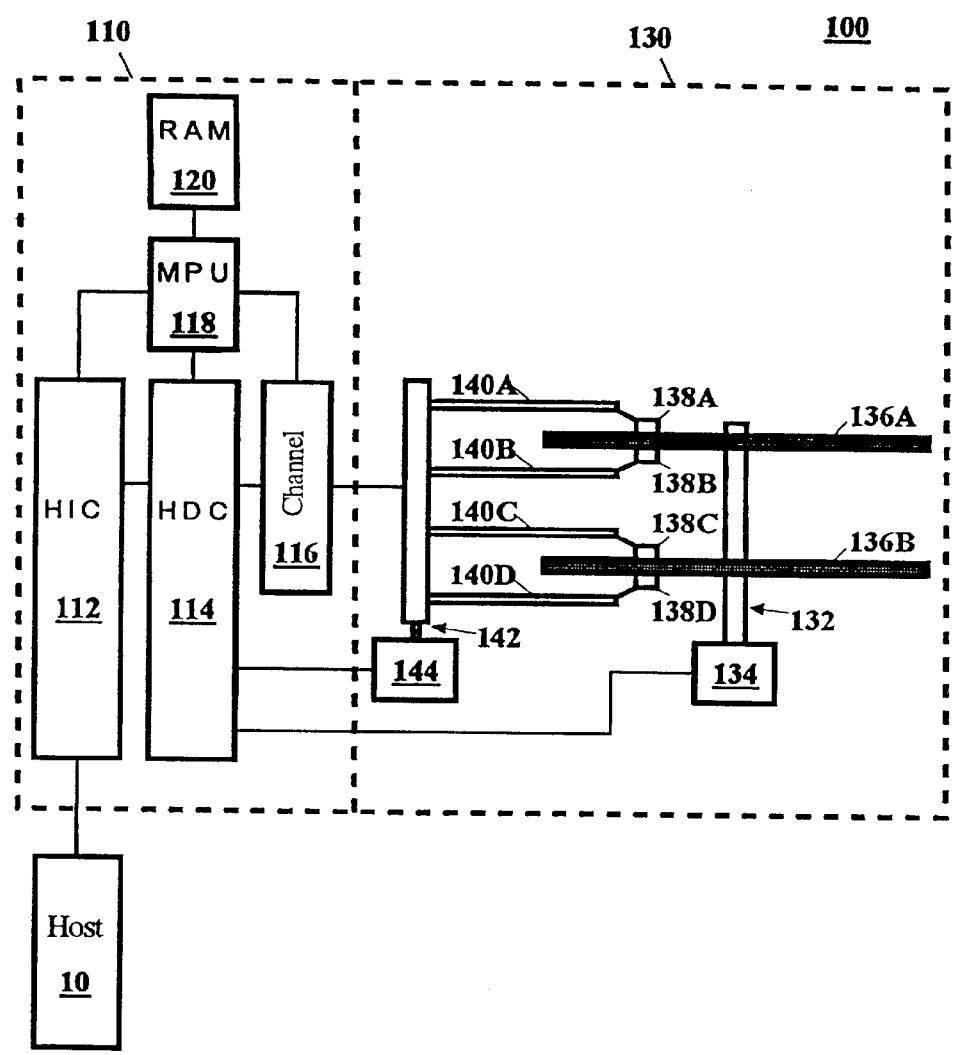
FIG. 1 is a block diagram of an HDD to which the present invention is implemented.

DETAILED DESCRIPTION OF THE PREFERRED EMBODIMENTS (1) Disk Drive in Which the Present Invention Is Implemented:

FIG. 1 is a block diagram of a HDD to which the present invention is implemented. A disk unit 100 is constructed of a controller section 110 and a disk section 130. The controller section 110 includes a host interface controller (HIC) 112 connected to a host computer 10, a hard-disk controller (HDC) 114 connected to the HIC 112 to control the disk section, a channel 116 connected to the HDC 114 to control read and write signals, a microprocessor unit (MPU) 118 connected to the HIC 112, HDC 114, and channel 116 to control them, and a random access memory (RAM) 120 connected to the MPU 118 to store microcodes that are executed by the MPU 118. The disk section 130 is equipped with a motor 134 that spins a spindle 132. Disks 136A and 136B are mounted on the spindle 132 so that they can rotate integrally with the spindle 132. Although two disks are shown, one disk, or three or more disks may be provided.

Read/write heads 138A, 138B, 138C, and 138D are respectively supported and arranged on the actuator arms 140A, 140B, 140C, and 140D so that they are opposed to the corresponding disk surfaces. The actuator arms 140A through 140D are attached to a voice coil motor (VCM) 144 via pivot shaft 142, and with the rotation, the read/write heads 138A through 138D are moved to desired radial positions on the disks, respectively. The motor 134 and VCM 144 are connected to the HDC 114, and the number of rotations, speed, and the like can be controlled. The read/write heads 138A through 138D are connected to the channel 116, and read and write signals are controlled by the channel 116.

Figure 2:
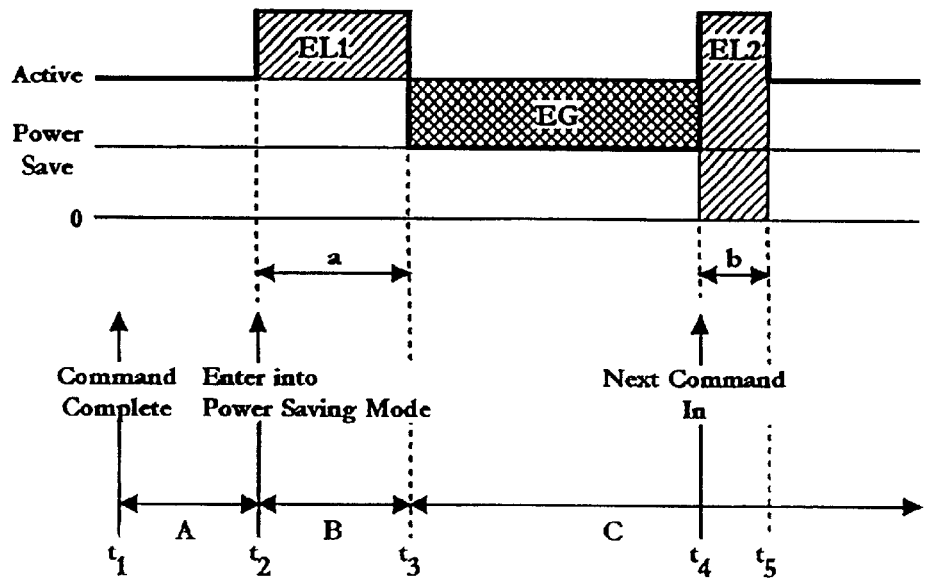
FIG. 2 illustrates the transition of power dissipation between before and after a power saving mode.

(2) Calculations of the Electric Power Dissipation That Is Expected to Be Saved and the Delay Time of the Next Command:

FIG. 2 shows the transition of power dissipation between before and after a power saving mode. In the diagram, the horizontal axis represents time and the vertical axis represents power dissipation. Note that the diagram is simplified for explanation, and scales, waveforms, etc. are not accurate. First, if the execution of a command is completed at time $t_1$, after a predetermined time has elapsed the HDD starts a transition from an active mode to a power saving mode at time $t_2$, and performs an operation of unloading the read/write head from the disk. With the unloading operation, the HDD dissipates more power than the active mode. The electric energy (power) dissipation corresponding to an area indicated as an oblique-line portion (energy loss (EL) 1) results in the loss of power for making a transition from the active mode to the power saving mode. The HDD completes a transition to the power saving mode at time $t_3$ and is in the power saving mode until it receives the next command at time $t_4$. At this time, the HDD dissipates less power than the active mode, and the electric energy dissipation corresponding to an area indicated as a net-line portion (energy (EG)) results in the gain of power obtained by making a transition from the active mode to the power saving mode. At time $t_4$, if the HDD receives the next command, the HDD performs an operation for returning to the active mode, such as an operation of loading the read/write head stand-by onto the disk again, in order to process the next command. At this time, the HDD dissipates more power than the active mode because of the return operation. In addition, during the return operation, the response to the command is delayed during the period, so that the electric energy dissipation corresponding to an area indicated as oblique-line portion EL2, which is the total power dissipation of the HDD during the delay time, results in the loss of power for returning from the power saving mode to the active mode. At time $t_5$, the HDD completes the return operation and starts processing the command.

The electric energy dissipation (TEG) saved by making a transition to the power saving mode instead of remaining in the active mode is calculated by the following equation.

$$TEG = EG - (EL1 + EL2) \quad (1)$$

Here, EL1 and EL2 are constant. Therefore, if the EG obtained by making a transition to the power saving mode is less than EL1+EL2, the electric energy dissipation will become negative and therefore the HDD will dissipate more power than the case where no transition to the power saving mode is made. Therefore, in order to increase the electric energy dissipation to be saved, it is necessary that the HDD be in the power saving mode for more than a predetermined time.

Furthermore, referring to FIG. 2, the electric power dissipation to be saved is zero and the delay time is also zero, in the case where the HDD receives the next command at a certain time within the period (indicated as A) before a transition to the power saving mode starts.

Also, a mechanism for controlling the HDD is generally constructed so that the HDD completely enters the power saving mode and then returns from that mode. For this reason, in the case where the HDD receives the next command during a transition to the power saving mode (i.e., during period B), the electric energy dissipation to be saved is calculated by the following equation.

$$TEG = -(EL1 + EL2 + EL3) \quad (2)$$

Therefore, the HDD dissipates more power than the case where no transition to the power saving mode is made. Here, EL3 is the time from reception of the next command to completion of the transition to the power saving mode, multiplied by the power dissipation in the active mode. The delay time of a response to a command is the sum of the time from reception of the next command to completion of a transition to the power saving mode and the time required to return from the power saving mode shown by b in FIG. 2.

Furthermore, after a transition to the power saving mode has been completed (i.e., during period C), in the case where the HDD receives the next command, the electric energy dissipation to be saved as described above is calculated by the following equation.

$$TEG=EG-(EL1+EL2) \quad (3)$$

Therefore, the longer the time that the HDD is in the power saving mode, the more the savable power. However, in the case where the time in the power saving mode is short and EG is less than (EL1+EL2), more power is dissipated than in the case where there is no transition to the power saving mode. Also, the delay time in this case is only the time taken to return from the power saving mode shown by b in FIG. 2.

Figure 3:
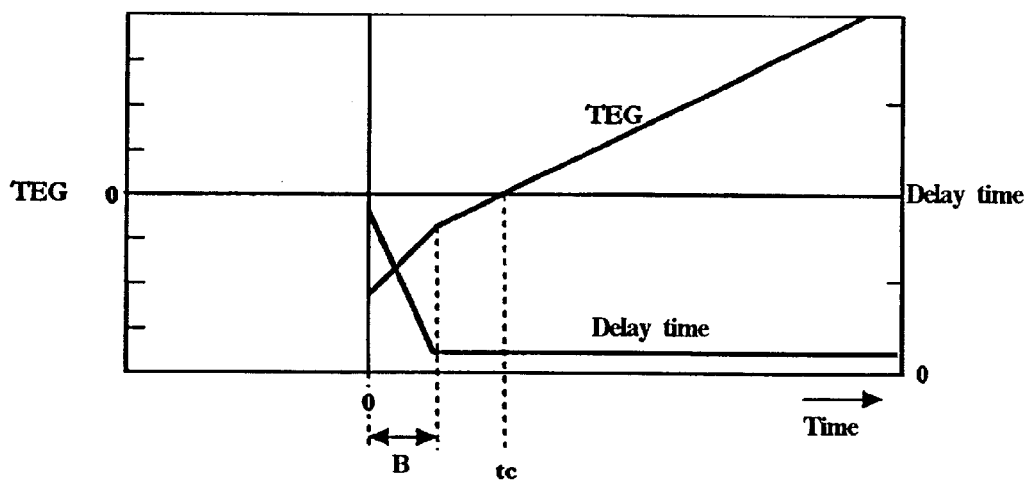
FIG. 3 illustrates the relation between timing for receiving the next command, electric energy dissipation TEG, and a delay time.

From the foregoing, the relation between the timing for receiving the next command, the electric energy dissipation TEG, and the delay time is obtained as shown by a graph of FIG. 3. Assuming that the timing (time $t_2$ in FIG. 2) at which a transition to the power saving mode is started is zero, the timing before that is displayed as negative and the timing after that as positive.

In FIG. 3, within the period equivalent to the period B of FIG. 2 since the next command was received at time 0, Equation (2) applied for savable electric energy dissipation. At this time, with the lapse of time, EL3 decreases, while EL1 and EL2 are constant. Thus, the savable electric energy dissipation at time 0 assumes the minimum value (in this case, a negative number). The amount of savable electric energy dissipation increases linearly over time interval B.

If the period equivalent to period B has elapsed, in the period equivalent to period C then Equation (3) applies for the savable electric energy dissipation. At this time, as time goes by, EG increases, while EL1 and EL2 are constant. Thus, the savable electric energy dissipation increases linearly. At time tC, the power gain EG, obtained by entering the power saving mode, is balanced by the electric energy dissipation required for a transition to the power saving mode and a return from that mode. Thus, the amount of savable electric energy dissipation is zero. Thereafter, the savable electric energy dissipation goes to a positive value and increases linearly.

In view of the foregoing, if the HDD receives the next command between the timing at which a transition to the power saving mode starts and time $t_c$, TEG will go to a negative value and therefore more power will be dissipated than in the case where the HDD remains in the active mode. On the other hand, if the HDD receives the next command after time $t_c$, TEG will go to a positive value and therefore more power will be saved than in the case where the HDD remains in the active mode.

In FIG. 3, within the period equivalent to the period B of FIG. 2 since the next command was received at time 0, the delay time between reception of the command and the start of the response is obtained as follows. That is, at time 0, the sum of the times required for a transition to the power saving mode and a return from that mode is (a+b). Thus, the delay time is maximized as the next command is received immediately after the start of the transition. Thereafter, as the transition to the power saving mode advances, the remaining time of the time required for the transition decreases, and the delay time decreases in linearly. If the period equivalent to period B has elapsed, the delay time is only the time b required for a return to the active mode. Thus, at this time, the delay time is minimized.

Figure 4:
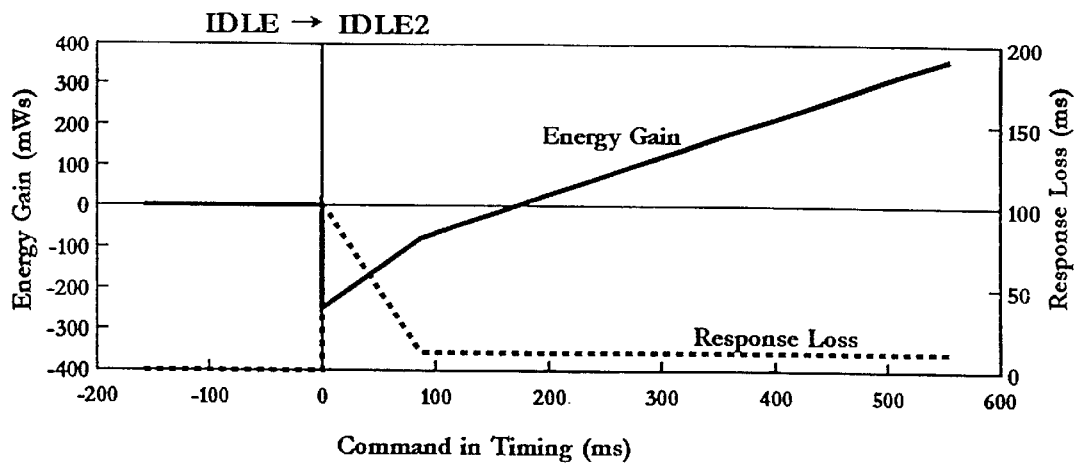
FIG. 4 illustrates the relation between a command interval, savable electric energy dissipation, and a delay time, when the HDD makes a transition from an IDLE mode to an IDLE2 mode.
Figure 5:
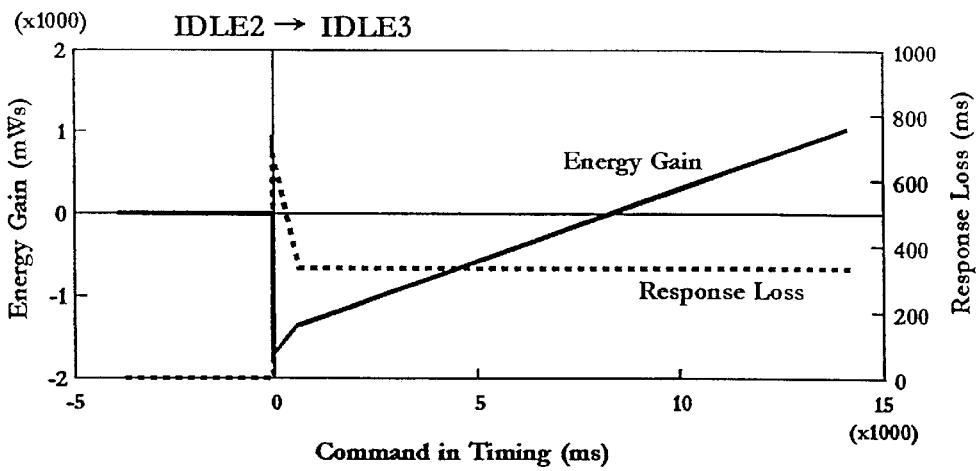
FIG. 5 illustrates the relation between a command interval, savable electric energy dissipation, and a delay time, when the HDD makes a transition from the IDLE2 mode to an IDLE3 mode.
Figure 6:
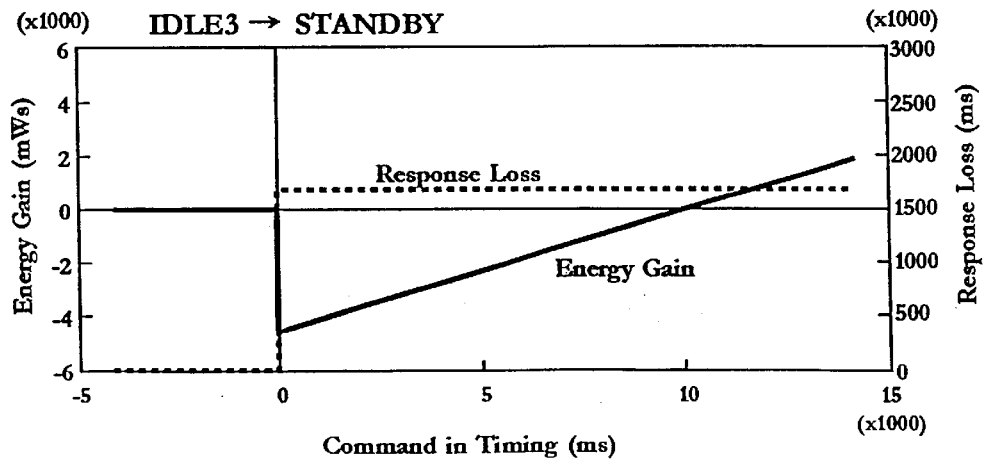
FIG. 6 illustrates the relation between a command interval, savable electric energy dissipation, and a delay time, when the HDD makes a transition from the IDLE3 mode to a STANDBY mode.

FIGS. 4, 5, and 6 illustrate changes in TEG (indicated as "Energy Gain" in the figures) and a delay time (indicated as "Response Loss" in the figures) for four power saving modes. In these figures, IDLE mode is a mode in which only track following operations are performed, no data read or write operations are performed. In an IDLE2 mode no track following operations by reading of a servo signal is performed and no power is supplied to the channel. In HDD's with a loading/unloading mechanism, in an IDLE3 mode motor resistance is further reduced unloading the read/write head from the disk onto a ramp outside the disk. In STANDBY mode motor rotation is stopped. Therefore, power dissipation is reduced in an HDD at each of the following transitions IDLE mode to IDLE2 mode, IDLE2 mode to IDLE3 mode, and IDLE3 mode to STANDBY mode.

FIG. 4 shows the relation between the command interval, the savable electric energy dissipation, and the delay time, when the HDD makes a transition from the IDLE mode to the IDLE2 mode. In the transition between both modes, the only operations that are performed are the electrical switching operation of reading a servo signal and the microscopic mechanical motion of the read/write head by the track following operation. Thus, the power dissipation by the mode transition is relatively low and the delay time is also relatively small.

FIG. 5 shows the relation between the command interval, TEG, and the delay time, when the HDD makes a transition from the IDLE2 mode to the IDLE3 mode. In the transition between both modes, the mechanical operation of unloading the read/write head from the disk to evacuate it to the ramp is performed. Thus, the power dissipation by the mode transition is relatively high and the delay time is also relatively great.

FIG. 6 shows the relation between the command interval, TEG, and the delay time, when the HDD makes a transition from the IDLE3 mode to the STANDBY mode. In the transition between both modes, the operation of stopping or starting the motor is performed. Since such an operation requires a constant time, the power dissipation by the mode transition is relatively high and the delay time is also relatively great.

In the foregoing, while a description has been made with reference to the savable electric energy dissipation TEG in the period that a command is next received and the delay time of the command response, in the actual operation of the HDD the most power dissipation can be saved by predicting when the next command comes and then determining the time at which a transition to the power saving mode is started, in accordance with the timing. Also, it is necessary that the delay time at this time be in an allowable range.

Here, the prediction of when the next command comes is assumed based on information about the past command intervals. In this case, it is considered that the next command interval can be predicted more accurately in a method of adopting a distribution of the past command intervals as the next command interval than in a method of adopting a mere average of the past command intervals as the next command interval.

Hence, a plurality of times until the start of a transition to the power saving mode are selected. For each of the plurality of times, the graphs of FIGS. 4 through 6 are weighted by a command interval distribution, thereby computing the electric energy dissipation to be saved and the delay time of a response to the next command. In this manner, the relation between the time until the start of a transition to the power saving mode, the electric energy dissipation to be saved, and the delay time of a response to the next command can be known.

With this relation, the time until the start of a transition, at which the electric energy dissipation to be saved is maximized and the delay time is sufficiently small, can be determined.

Figure 7:
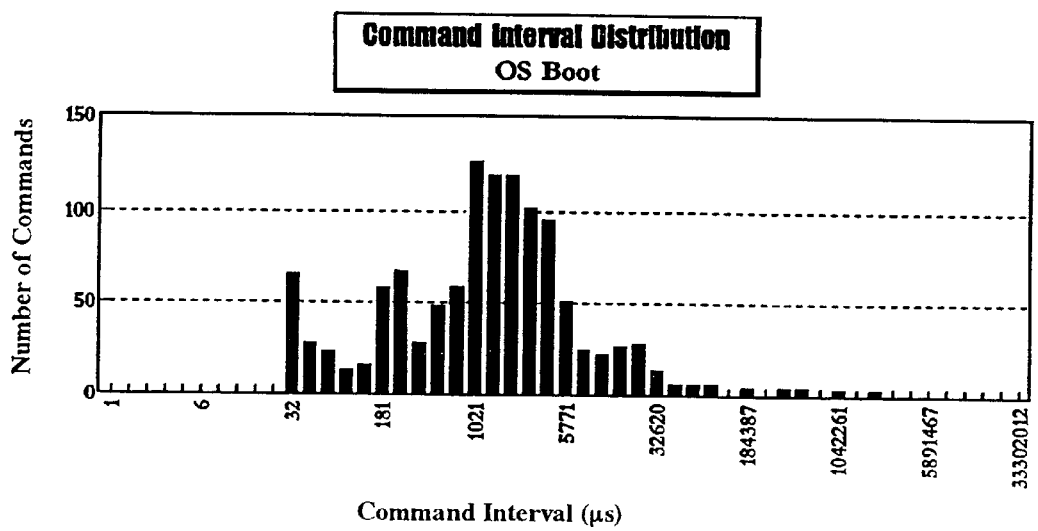
FIG. 7 illustrates a command interval distribution when a boot program in a certain operating system is executed.
Figure 8:
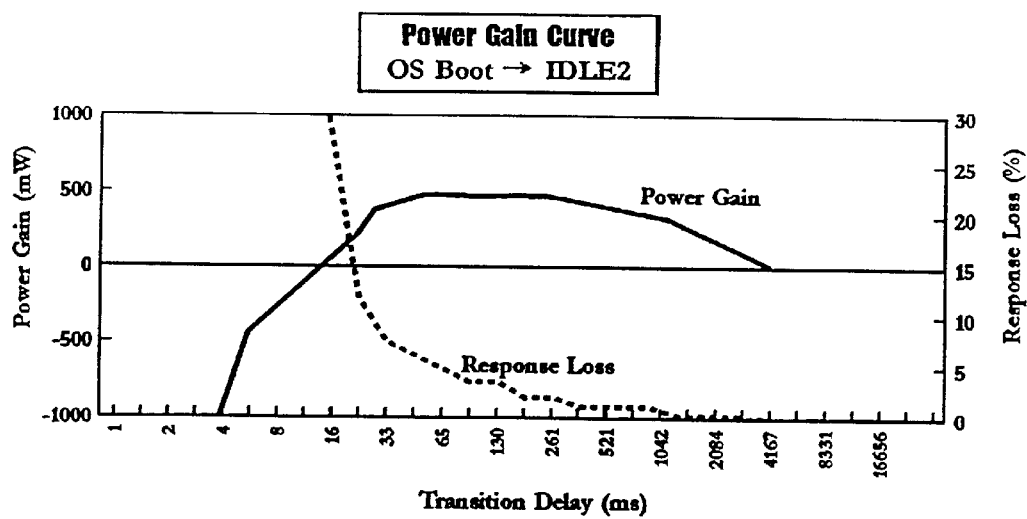
FIG. 8 illustrates the relation between a time until the start of a transition to the IDLE2 mode, savable electric energy dissipation, and a delay time, when weighting is performed by applying the command interval distribution of FIG. 7 as the time until the start of a transition to the IDLE2 mode in FIG. 4.
Figure 9:
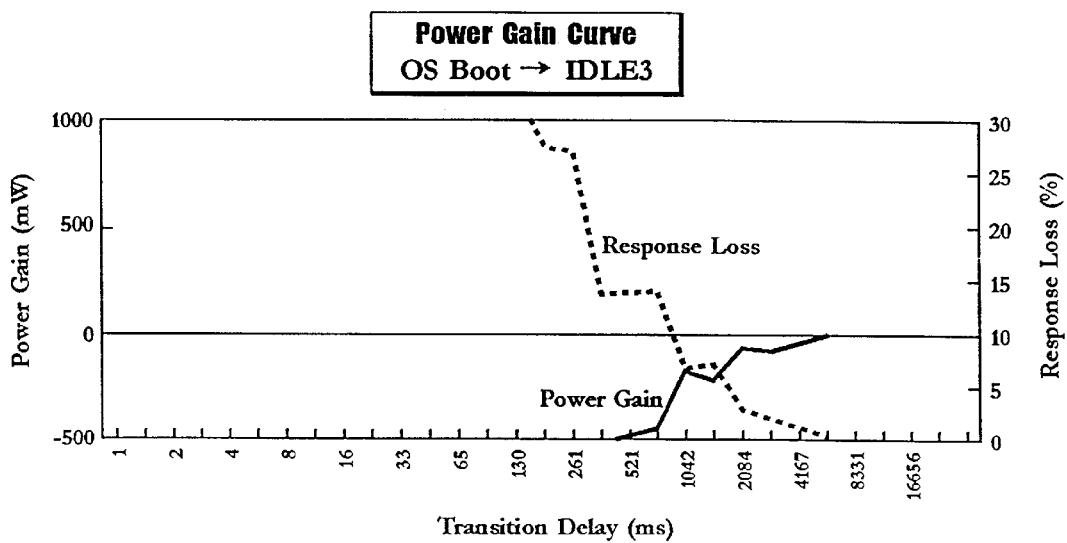
FIG. 9 illustrates the relation between a time until the start of a transition to the IDLE3 mode, savable electric energy dissipation, and a delay time, when weighting is performed by applying the command interval distribution of FIG. 7 as the time until the start of a transition to the IDLE3 mode in FIG. 5.
Figure 10:
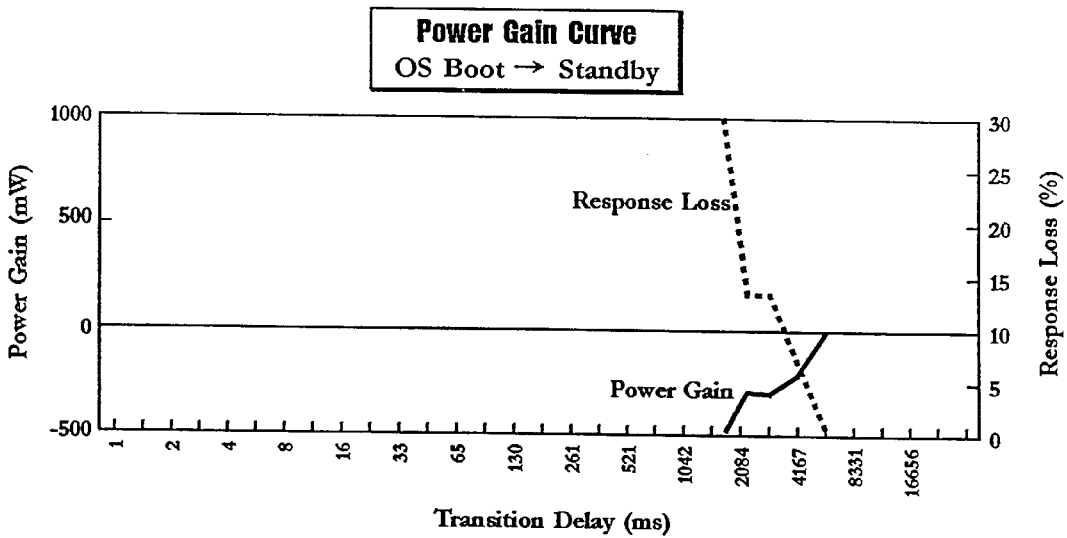
FIG. 10 illustrates the relation between a time until the start of a transition to the STANDBY mode, savable electric energy dissipation, and a delay time, when weighting is performed by applying the command interval distribution of FIG. 7 as the time until the start of a transition to the STANDBY mode in FIG. 6.
Figure 11:
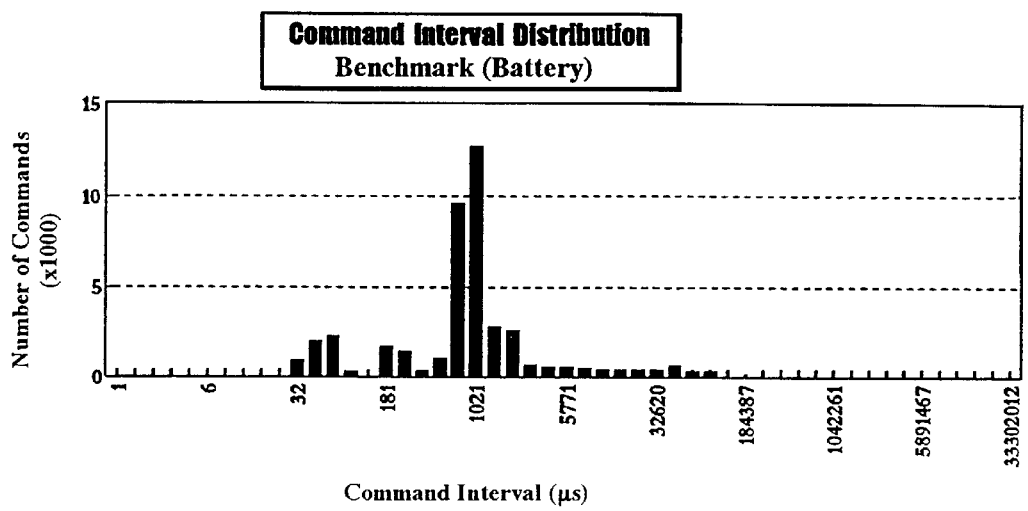
FIG. 11 illustrates a command interval distribution when one of the benchmark programs for comparing used battery hours is executed.

FIGS. 7 through 22 illustrate examples of the operation of embodiments of the present invention. FIG. 7 shows a command interval distribution when a boot program in a certain operating system (OS) is executed. FIGS. 8 through 10 show the changes in TEG and a delay rate in the case where this distribution is applied to a transition to each power saving mode. FIG. 8 shows the relation between a time until the start of a transition to the IDLE2 mode, savable power dissipation, and a delay rate, when weighting is performed by applying the command interval distribution of FIG. 7 as the time until the start of a transition to the IDLE2 mode in FIG. 4. In the graphs of FIG. 8 and the figures thereafter, the horizontal axis represents the time (displayed as "Transition Delay") between the end of the previous command and the start of a transition to the power saving mode (in this case, IDLE2 mode). The saved electric energy dissipation and the delay time are both divided by the time elapsed and are indicated as the saved power dissipation (displayed as "Power Gain") and the delay rate (displayed as "Response Loss), respectively. From the graph of FIG. 8 it follows that the saved power dissipation is greatest when a transition to the IDLE2 mode is started after about 100 ms since the previous command was completed. It also follows that the delay time is also sufficiently small after about 100 ms. Therefore, it is supposed that it is optimum to make a transition to the power saving mode after about 100 ms elapses since the previous command was completed.

FIG. 9, as with FIG. 8, shows the relation between a time until the start of a transition to the IDLE3 mode, savable power dissipation, and a delay rate, when weighting is performed by applying the command interval distribution of FIG. 7 as the time until the start of a transition to the IDLE3 mode in FIG. 5. From the graph of FIG. 9 it follows that there is no effect of saving power until about 6000 ms elapses since the previous command was completed. Therefore, at this time, it is supposed that it is good not to make a transition to the IDLE3 mode.

FIG. 10, as with FIG. 8, shows the relation between a time until the start of a transition to the STANDBY mode, savable power dissipation, and a delay rate, when weighting is performed by applying the command interval distribution of FIG. 7 as the time until the start of a transition to the STANDBY mode in FIG. 6. From the graph of FIG. 10 it follows that there is no effect of saving power until about 6000 ms elapses since the previous command was completed. Therefore, at this time, it is supposed that it is good not to make a transition to the STANDBY mode.

Figure 12:
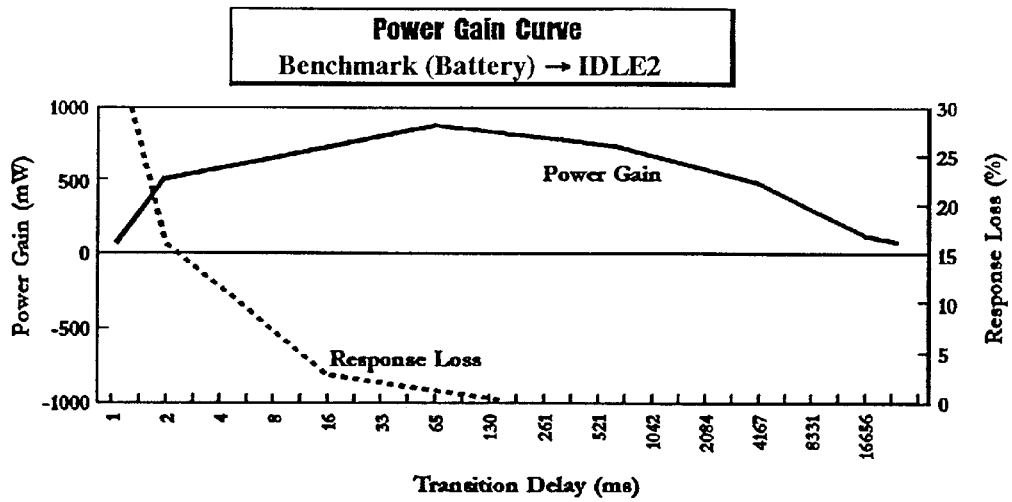
FIG. 12 illustrates savable power dissipation and a delay rate in the case where this distribution is applied to a transition to each power saving mode.
Figure 13:
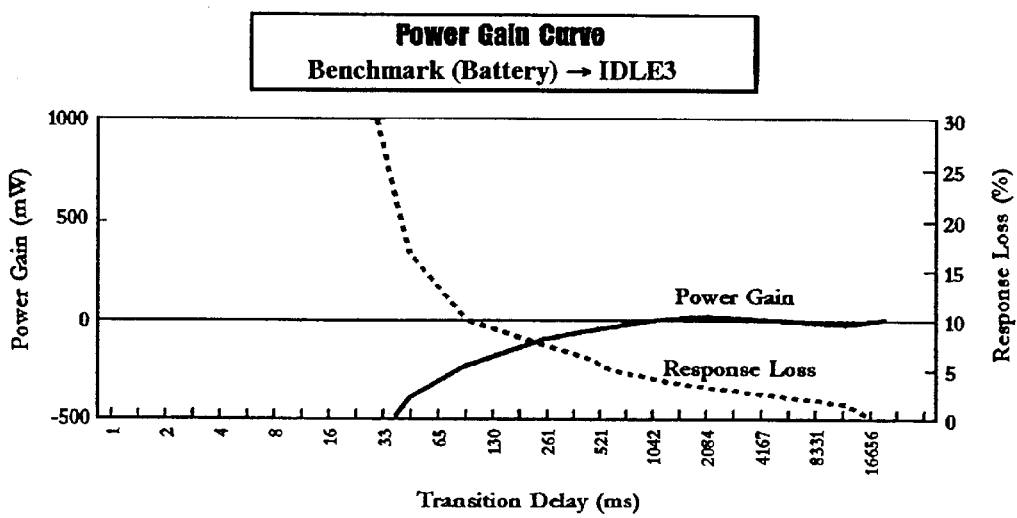
FIG. 13 illustrates savable power dissipation and a delay rate in the case where this distribution is applied to a transition to each power saving mode.
Figure 14:
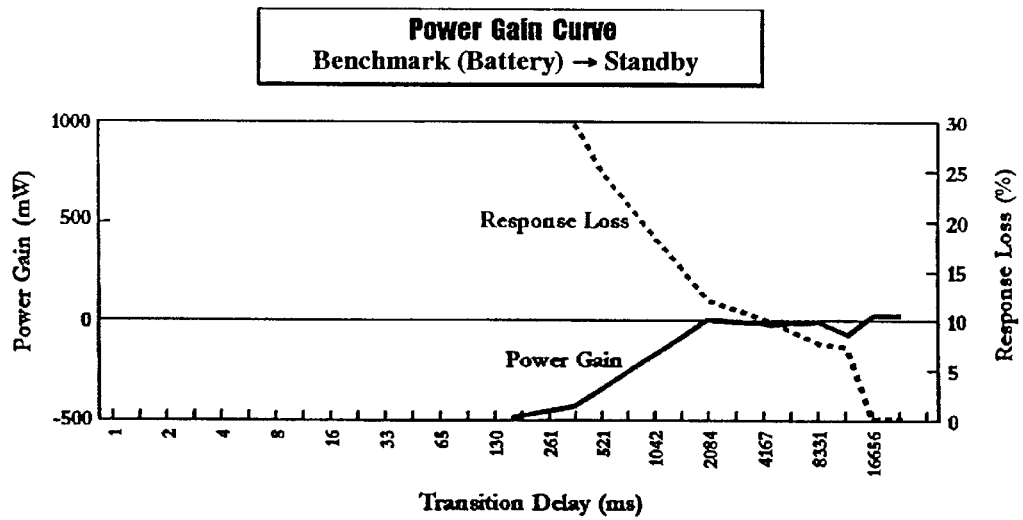
FIG. 14 illustrates savable power dissipation and a delay rate in the case where this distribution is applied to a transition to each power saving mode.
Figure 15:
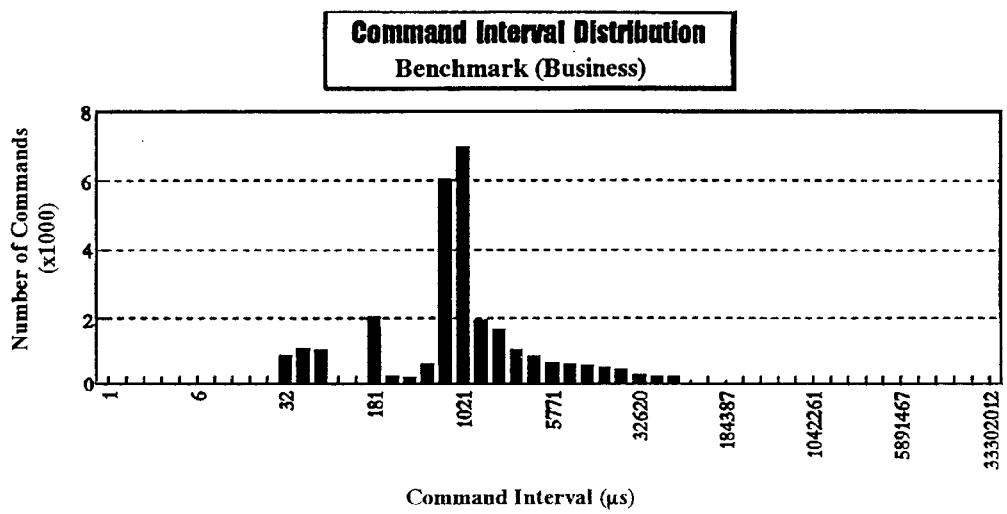
FIG. 15 illustrates a command interval distribution when one of the benchmark programs for comparing the execution performances of business application programs is executed.

FIGS. 11 through 14 show a command interval distribution when one of the benchmark programs for comparing used battery hours is executed (FIG. 11) and show changes in TEG and a delay time in the case where this distribution is applied to a transition to each power saving mode (FIGS. 12 through 14). In FIG. 12 the saved power dissipation is greatest when a transition to the IDLE2 mode is started after about 100 ms since the previous command was completed. It is also understood that the delay time is sufficiently small after about 100 ms. In FIG. 13 there is no effect of saving power until about 1500 ms elapses since the previous command was completed. On the other hand, the delay time is sufficiently small after about 2000 ms. In FIG. 14 there is no effect of saving power until about 2000 ms elapses since the previous command was completed. On the other hand, the delay time is negligibly small after about 16000 ms.

Figure 16:
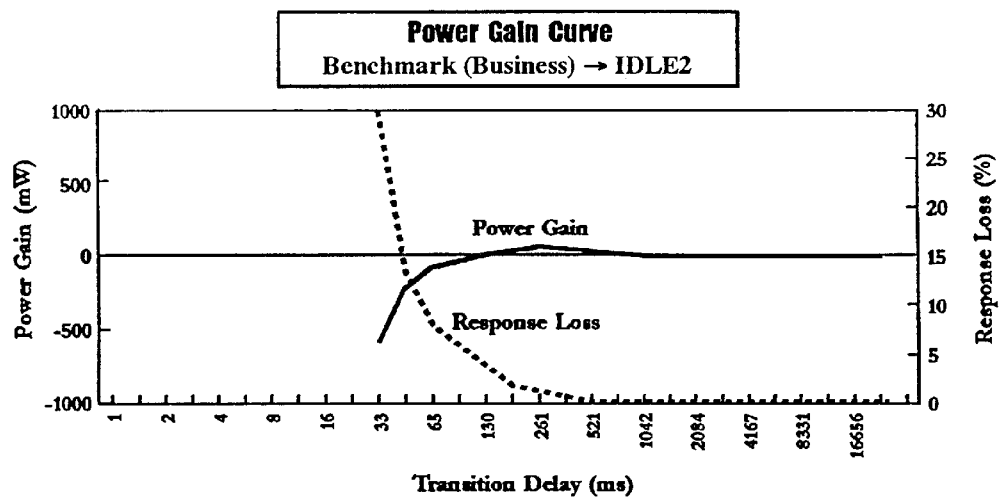
FIG. 16 illustrates savable power dissipation and a delay rate in the case where this distribution is applied to a transition to each power saving mode.
Figure 17:
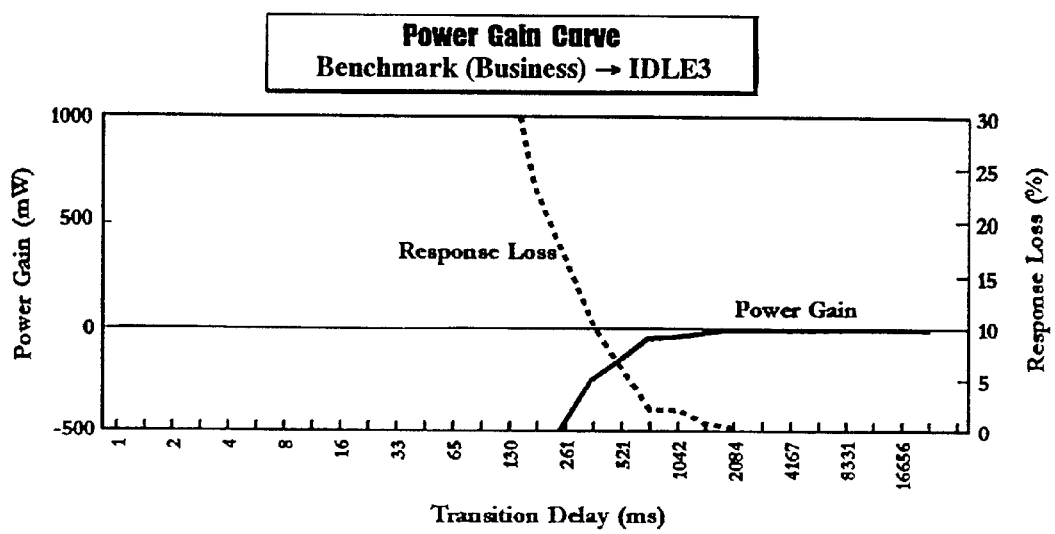
FIG. 17 illustrates savable power dissipation and a delay rate in the case where this distribution is applied to a transition to power saving mode.
Figure 18:
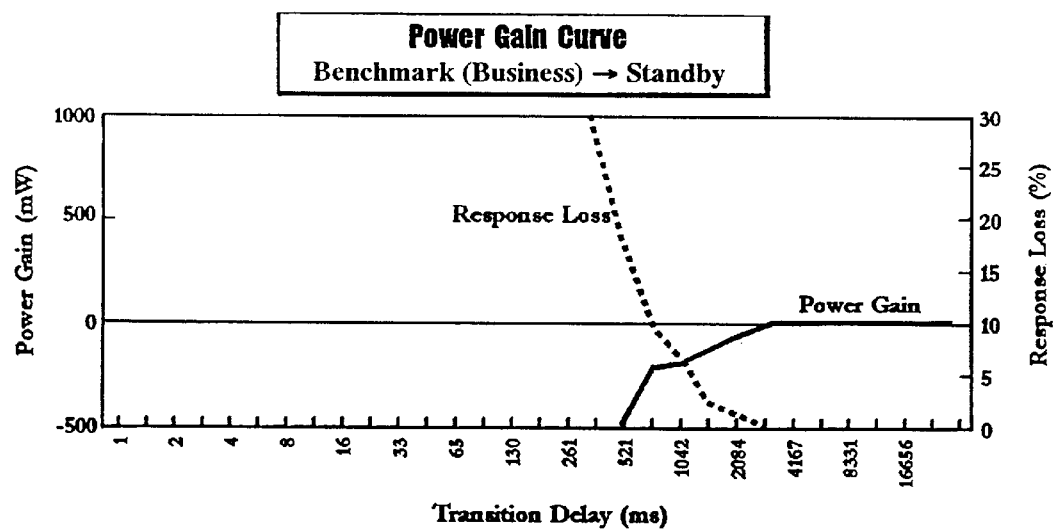
FIG. 18 illustrates savable power dissipation and a delay rate in the case where this distribution is applied to a transition to each power saving mode.
Figure 19:
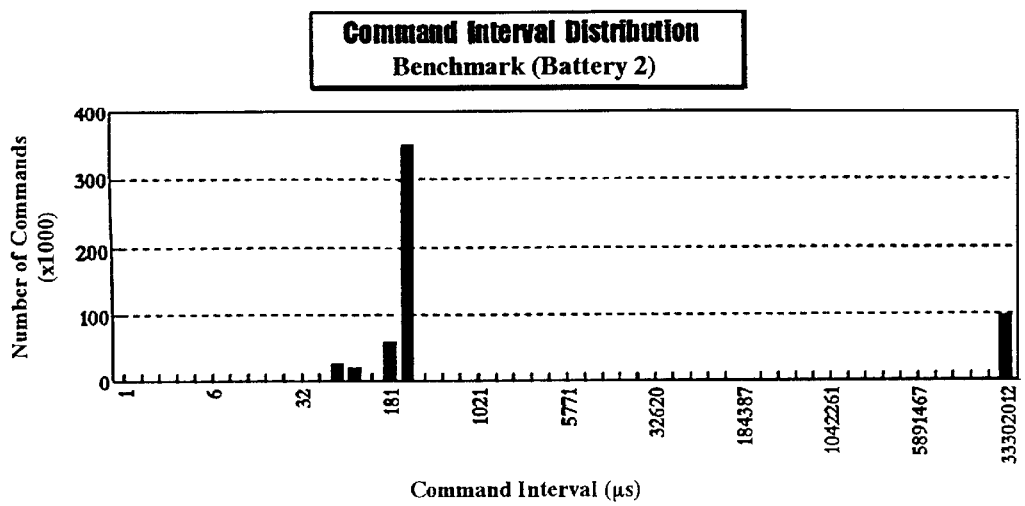
FIG. 19 illustrates a command interval distribution when another benchmark program for comparing used battery hours is executed.

FIGS. 15 through 18 show a command interval distribution when one of the benchmark programs for comparing the execution performances of business application programs is executed (FIG. 15) and show changes in TEG and a delay time in the case where this distribution is applied to a transition to each power saving mode (FIGS. 16 through 18). In FIG. 16 the saved power dissipation is greatest when a transition to the IDLE2 mode is started after about 200 ms since the previous command was completed. It is also understood that the delay time is sufficiently small after about 200 ms. In FIG. 17 there is no effect of saving power until about 2000 ms elapses since the previous command was completed. On the other hand, the delay time is sufficiently small after about 2000 ms. In FIG. 18 there is no effect of saving power until about 3000 ms elapses since the previous command was completed. On the other hand, the delay time is negligibly small after about 3000 ms.

Figure 20:
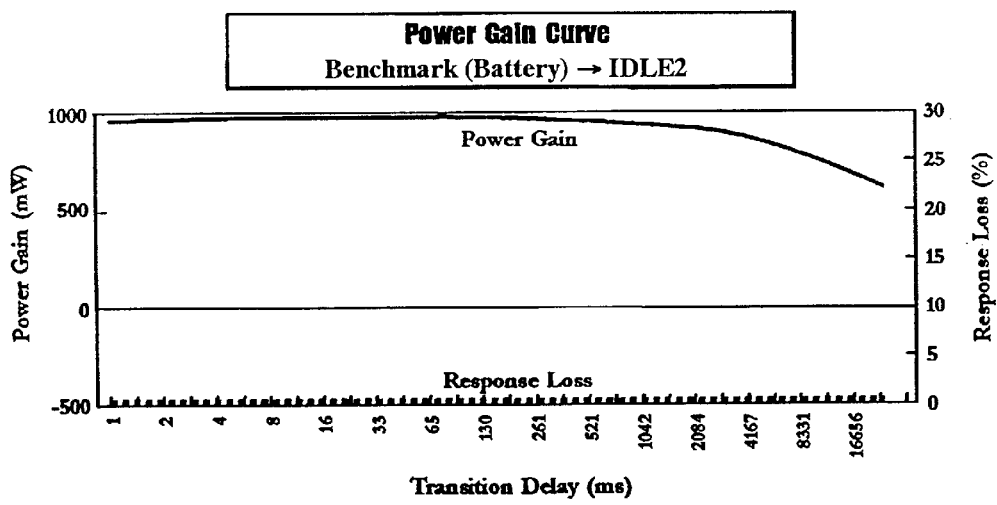
FIG. 20 illustrates savable power dissipation and a delay rate in the case where this distribution is applied to a transition to each power saving mode.
Figure 21:
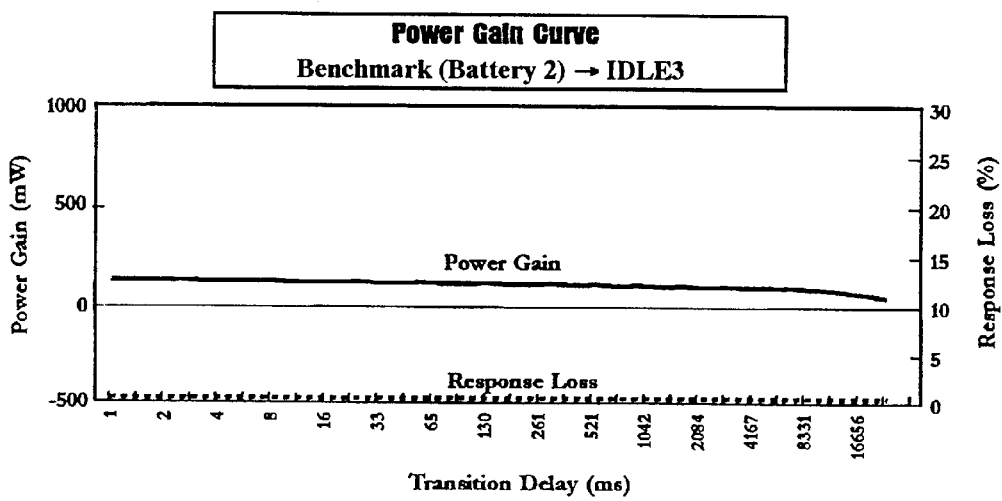
FIG. 21 illustrates savable power dissipation and a delay rate in the case where this distribution is applied to a transition to each power saving mode.
Figure 22:
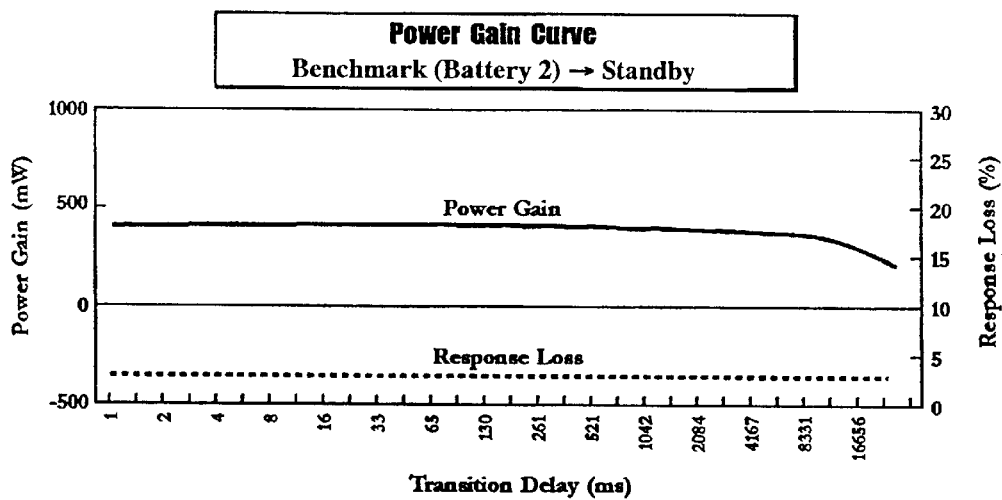
FIG. 22 illustrates savable power dissipation and a delay rate in the case where this distribution is applied to a transition to each power saving mode.

FIGS. 19 through 22 show a command interval distribution when another benchmark program for comparing the execution performances of business application programs is executed (FIG. 19) and show changes in TEG and a delay time in the case where this distribution is applied to a transition to each power saving mode (FIGS. 20 through 22). In FIG. 20 the saved power dissipation is greatest when a transition to the IDLE2 mode is started after about 1000 ms since the previous command was completed. It is also understood that the delay time is negligibly small through this period. In FIG. 21 the saved power dissipation is greatest when a transition to the IDLE3 mode is started between completion of the previous command and about 12000 ms. On the other hand, it is also understood that the delay time is negligibly small through this period. In FIG. 22 the saved power dissipation is greatest when a transition to the IDLE3 mode is started between completion of the previous command and about 4000 ms. On the other hand, it is also understood that the delay time is sufficiently small through this period.

(3) Dynamic Control:

The foregoing description has analyzed which timing is effective in making a transition to the power saving mode, based on the past access pattern. Assuming the next command is received with the same distribution as the time distribution of the command intervals of the past access pattern, the analyzed effective timing also is effective for commands that will be received. The present invention determines timing at which a transition to the power saving mode is made, based on the past access pattern.

To simplify calculations and reduce the number of past command intervals that must be held, in one embodiment of the present invention the command intervals are divided into a plurality of time regions. At respective time regions, the data about the number of command intervals and an average time of the time region are held. In this manner, the total saved electric energy can be approximated by adding a saved electric energy dissipation calculated from the average time of each time region multiplied by the number of command intervals for all the time regions. The same also applies for the total delay time.

Also, in the case where the minimum time (i.e., 100 ms, etc.) until a transition to the power saving mode has been determined, a transition to the power saving mode is not made for command intervals shorter than that time. Thus, the saved electric energy dissipation and delay time with respect to that command interval are both zero. Therefore there is no need to hold them as data and therefore the amount of data that must be held can be saved by that amount.

(4) Command Interval:

For the past command interval that is employed in calculations, suppose that the time between completion of the previous command and reception of the next command, i.e., the time during which an interface is in an idle state is a command interval. The reason is for accurately judging when the host computer sends the next command. Conventionally, the time between reception of the previous command and reception of the next command is a command interval, but in this method the time required for the HDD to process a command is also included in the command interval. That is, both the time during which the host computer does not send a command intentionally and the time during which the HDD processes a command and waits for the next command are processed without discrimination. Therefore, the conventional method is unsuitable for judging when the host computer sends the next command.

(5) Past Command Interval Influence on Calculations:

It is predicted that the time between completion of the previous command and reception of the next command follows a time distribution relatively similar to past command intervals. Therefore, if the latest command interval distribution has the greatest influence on calculations and the old command interval distribution has a much smaller influence calculations, a desirable effect will be obtained. For this reason, the influence of the past command interval on calculations is reduced by half at intervals of a constant time. In the embodiment of the present invention, reducing the influence by half is achieved by reducing the number of command intervals in each time region by half at fixed intervals.

(6) Plurality of Power Saving Modes:

Embodiments with a plurality of power saving modes also compute the saved power dissipation and a delay time when a transition is made from a shallow power saving mode to a deep power saving mode as described above.

Figure 23:
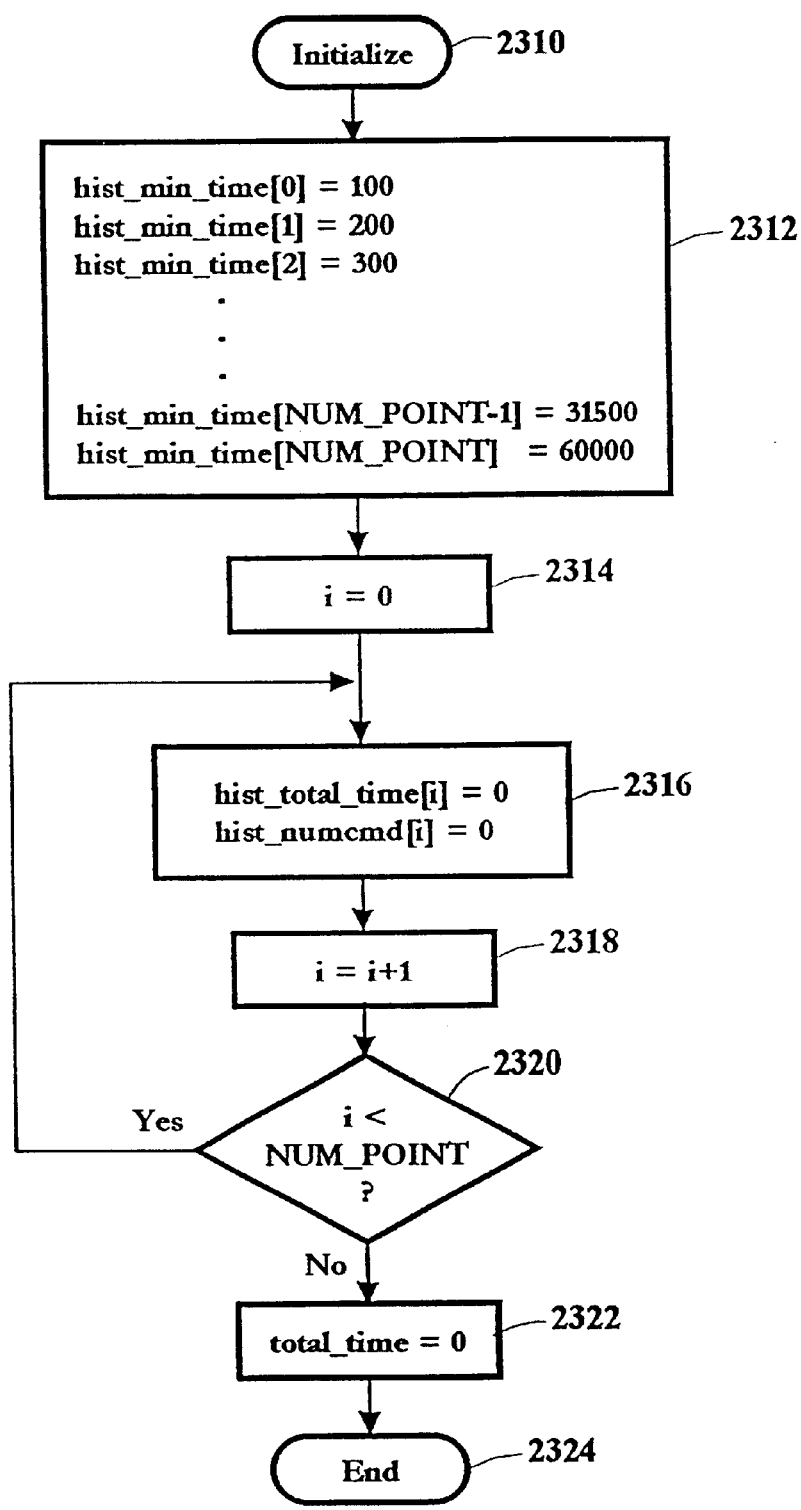
FIG. 23 is a flowchart showing a method for computing a command interval distribution.

(7) Methods of Operation:

FIGS. 23 through 32 show methods of operation. By way of illustration these methods are described in the context of microcode for an HDD. FIG. 23 illustrates a flowchart of a method for computing a command interval distribution such as those shown in FIGS. 7, 11, 15, and 19. In step 2310 an initialization program is started. In step 2312, time regions for command intervals are set. In this example, the number of time regions for command intervals is NUM_POINT. Note that in FIG. 23 the time intervals are given relative values and are therefore not limited to values directly displayed in a concrete unit such as a microsecond. The first time region is hist_min_time[0] and the time interval is set to a time more than 100. The second time region is hist_min_time[1] and the time interval is set to a time more than 200. The third time region is hist_min_time[2] and the time interval is set to a time more than 300. The NUM_POINT-th time region is hist_min_time[NUM_POINT-1] and the time interval is set to a time more than 31500. The (NUM_POINT+1)st time region is hist_min_time[NUM_POINT] and the time interval is set to a time more than 60000. It is preferable that the time intervals be divided in a logarithmic manner, as in this example.

After step 2312, the process advances to step 2314 and an initial value of i is set to 0. In the following step 2316, hist_total_time[i], which is the total number of the time intervals of commands in the time region, is initialized to 0, and hist_numcmd[i], which is the total number of commands in the time region, is initialized to 0. In the following step 2318, the value of i is increased by 1. In the following step 2320, if the value of i is less than NUM_POINT, the process returns to step 2316 again and steps 2316 through 2320 are repeated until the value of i is greater than NUM_POINT. That is, in steps 2314 through 2320, hist_total_time[i] and hist_numcmd[i] are initialized to 0 for all i's between 0 and NUM_POINT. In step 2320, if the value of i is greater than NUM_POINT, the process advances to step 2322 and the total time of all the command intervals (total_time) is initialized to 0. In step 2324 the initialization program ends.

Figure 24:
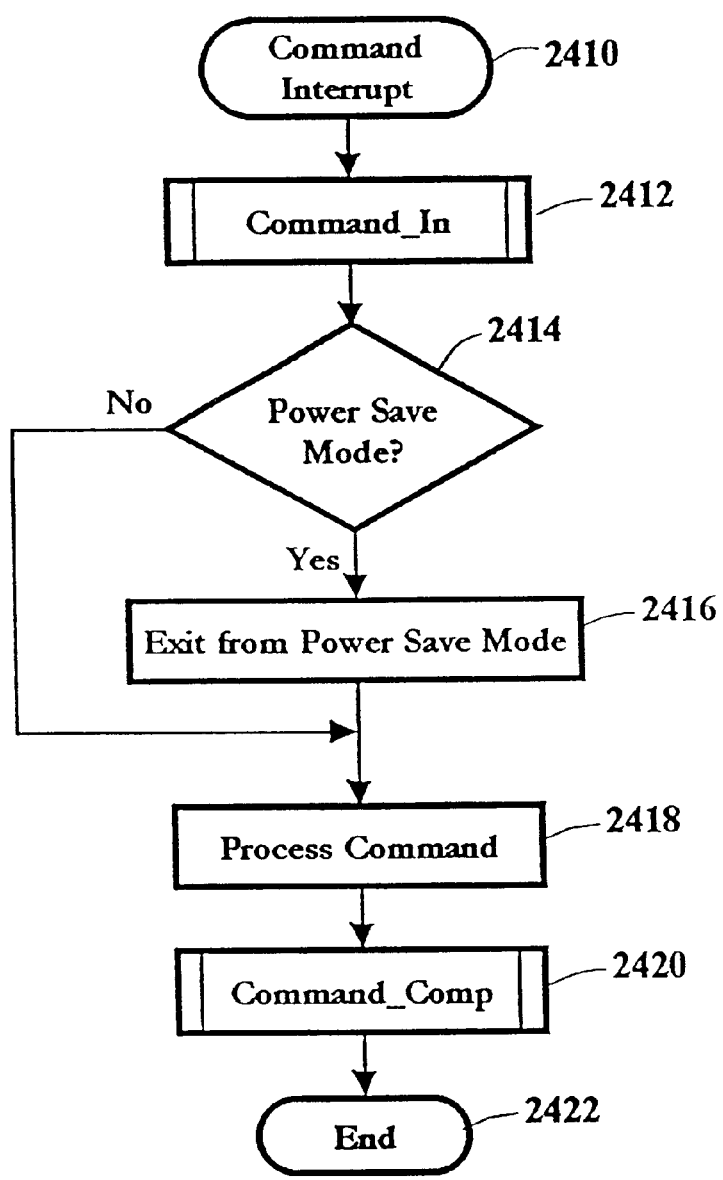
FIG. 24 is a flowchart showing the operation in the case where the HDD receives a command when operated.
Figure 25:
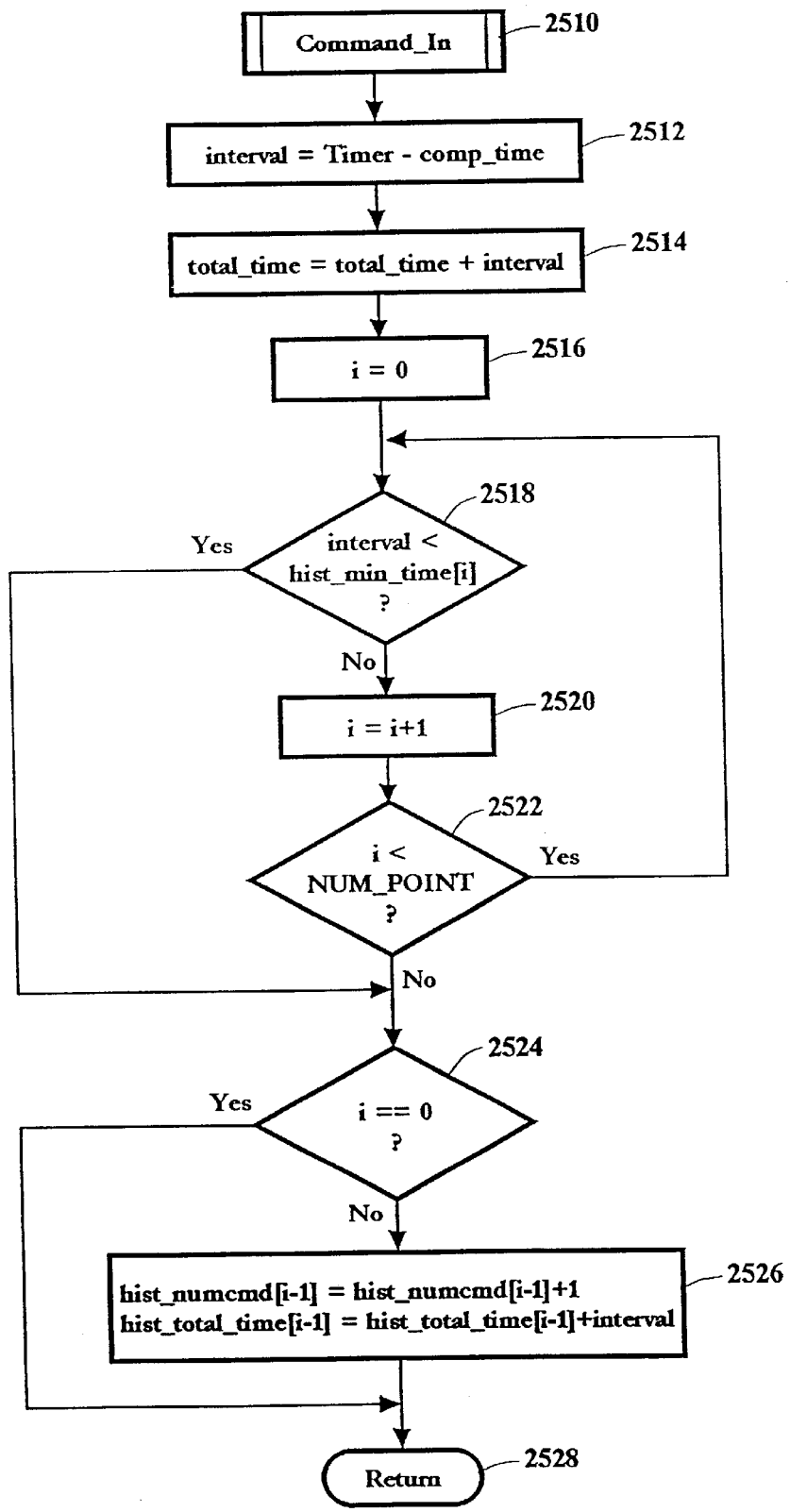
FIG. 25 is a flowchart describing in detail the command receiving subroutine of FIG. 24.
Figure 26:
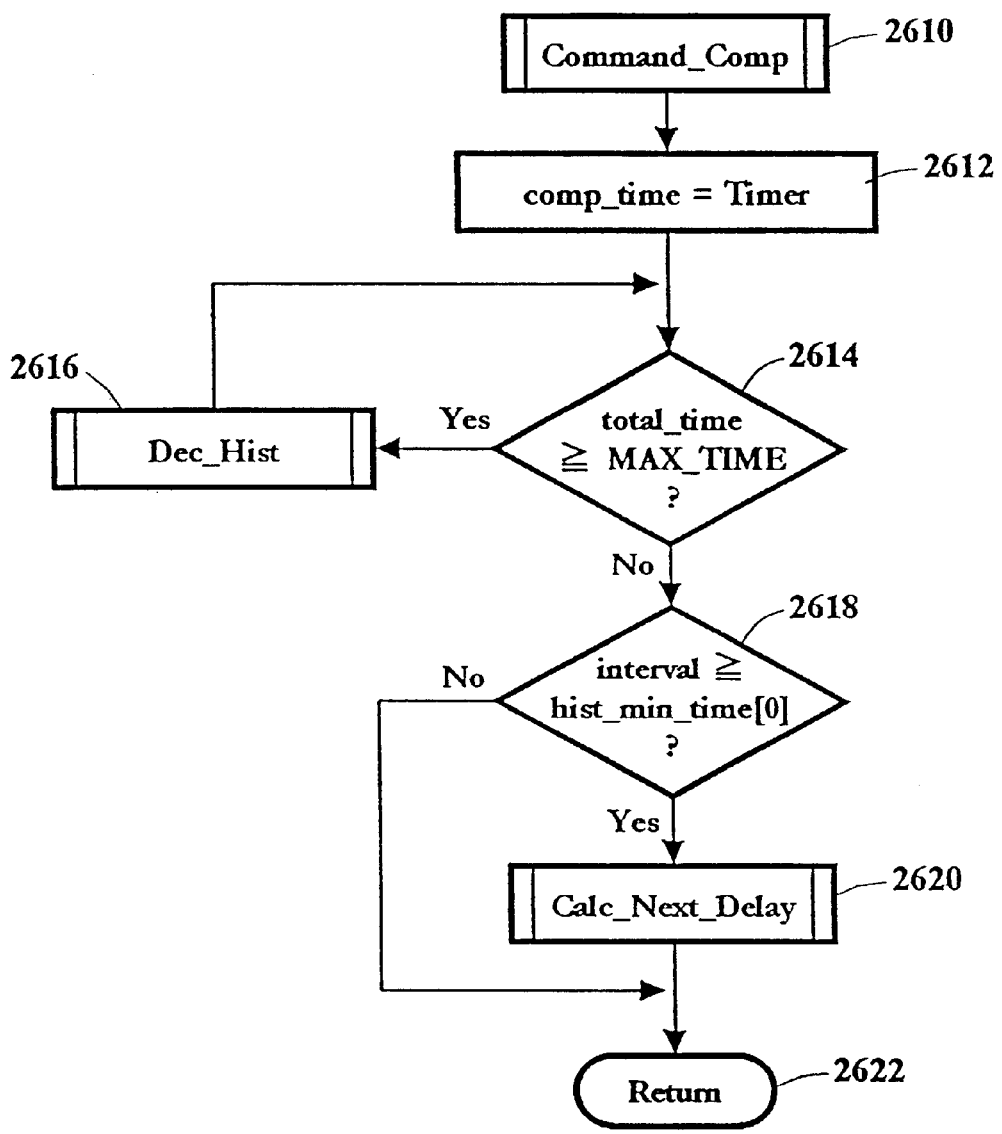
FIG. 26 is a flowchart describing in detail the command completing subroutine of FIG. 24.

FIG. 24 illustrates a flowchart of an embodiment where an HDD receives a command when operated. In step 2410 a program for interrupting a power saving mode by a command is started. In the following step 2412, a subroutine for receiving a command, shown in FIG. 25, is executed. If the HDD, which has completed the command receiving subroutine, receives the command from the host computer, in step 2414 it is judged whether or not the HDD is presently in the power saving mode. If the HDD is in the power saving mode, the process advances to step 2416, in which the HDD returns from the power saving mode to the active mode. Then, the process advances to step 2418. On the other hand, in step 2414, if the HDD is not presently in the power saving mode, the process advances to step 2418. In step 2418 the command is processed. In step 2420, a subroutine for completing a command, shown in FIG. 26, is executed. After completion of the command, in step 2422 the program for interrupting a power saving mode by a command is ended.

FIG. 25 is a flowchart describing in detail the command receiving subroutine shown in step 2412 of FIG. 24. In step 2510, if the command receiving subroutine is started, in step 2512 the completion time (comp_time) of a command completed just before is subtracted from the incorporated timer of the MPU in the HDD. The difference is a command interval (interval). In step 2514, the command interval (interval) is added to the total time. Let the sum is total_time. In step 2516, i is initialized to 0. In step 2518 it is judged whether or not the command interval (interval) is less than the $i^{th}$ time region (hist_min_time[i]). When it is judged that the command interval (interval) is less than the $i^{th}$ time region (hist_min_time[i]), the process advances to step 2524. On the other hand, in step 2518, when it is judged that the command interval (interval) is not less than the $i^{th}$ time region (hist min_time[i]), in step 2520 the value of i is increased by 1. In step 2522 it is judged whether or not the value of i is less than the number of time regions for command intervals (NUM_POINT). When the value of i is less than the number of time regions for command intervals (NUM_POINT), the process returns to step 2518 again, in which it is judged whether or not the command interval belongs to the second smallest time interval. On the other hand, in step 2522, when the value of i is not less than the number of time regions for command intervals (NUM_POINT), i.e., when the value of i is greater than the number of time regions for command intervals (NUM_POINT), the process advances to step 2524. In step 2524 it is judged whether or not the value of i equals 0. When the value of i equals 0, i.e., when in step 2518 the command interval (interval) is less than the $i^{th}$ time region (hist_min_time[i]), it means that the command interval is shorter than the minimum time until a transition to a power saving mode. As described above, there is no need to hold data, so the process advances to step 2528 and ends the subroutine. On the other hand, in step 2524, when the value of i does not equal 0, i.e., when the command interval (interval) belongs to the $i^{th}$ (where i g 1) time region (hist_min_time[i−1]), the process advances to step 2526 and increases the total number of commands in the $i^{th}$ time region (hist_numcmd[i−1]) by 1. Furthermore, the total number of the time intervals of commands in the $i^{th}$ time region (hist_total_time[i−1]) is added with the corresponding command interval (interval). Let the sum is hist_total_time[i−1]. In step 2528, the subroutine ends.

Figure 27:
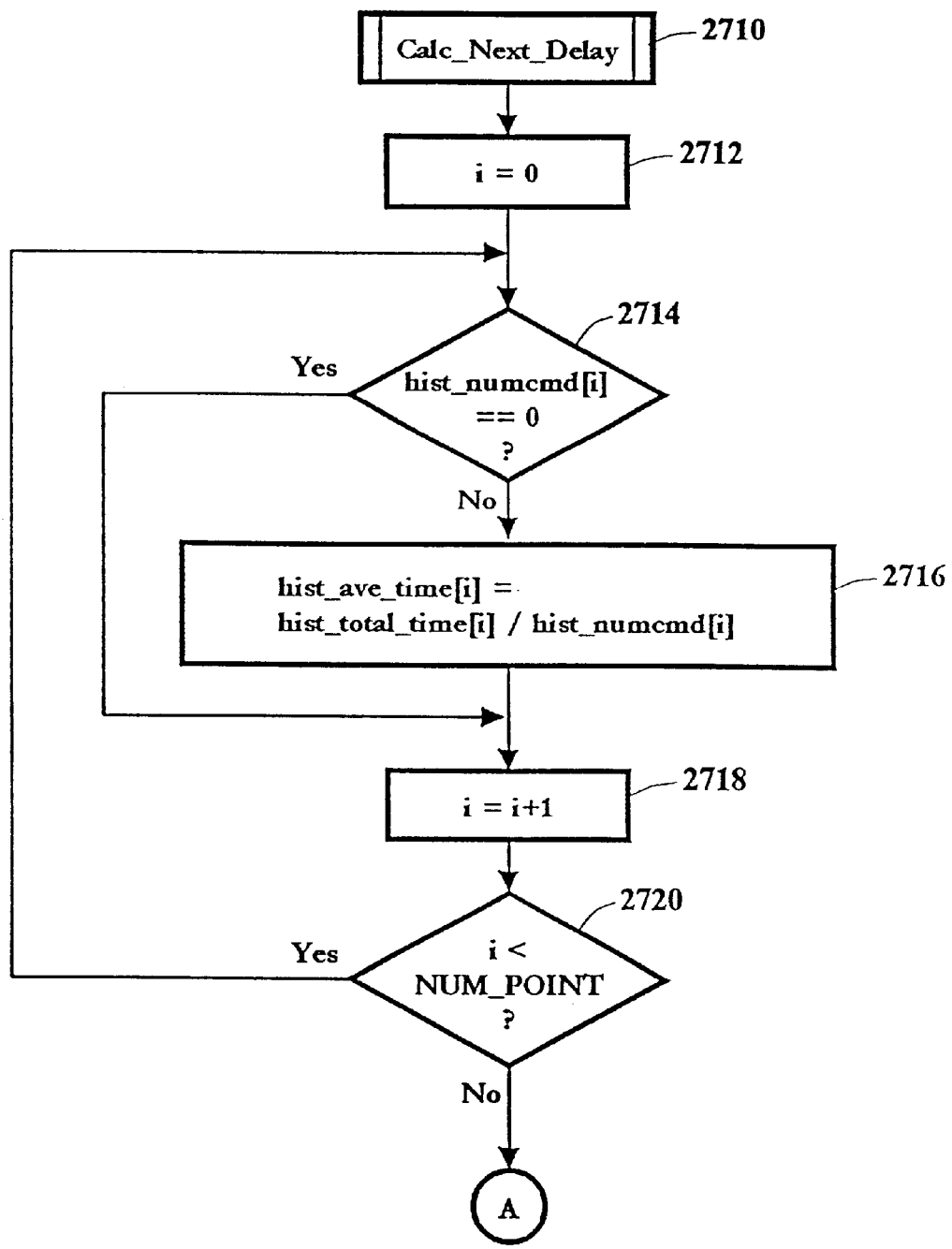
FIG. 27 is a flowchart describing in detail the FIG. 26 subroutine that determines when to enter a power saving mode.
Figure 31:
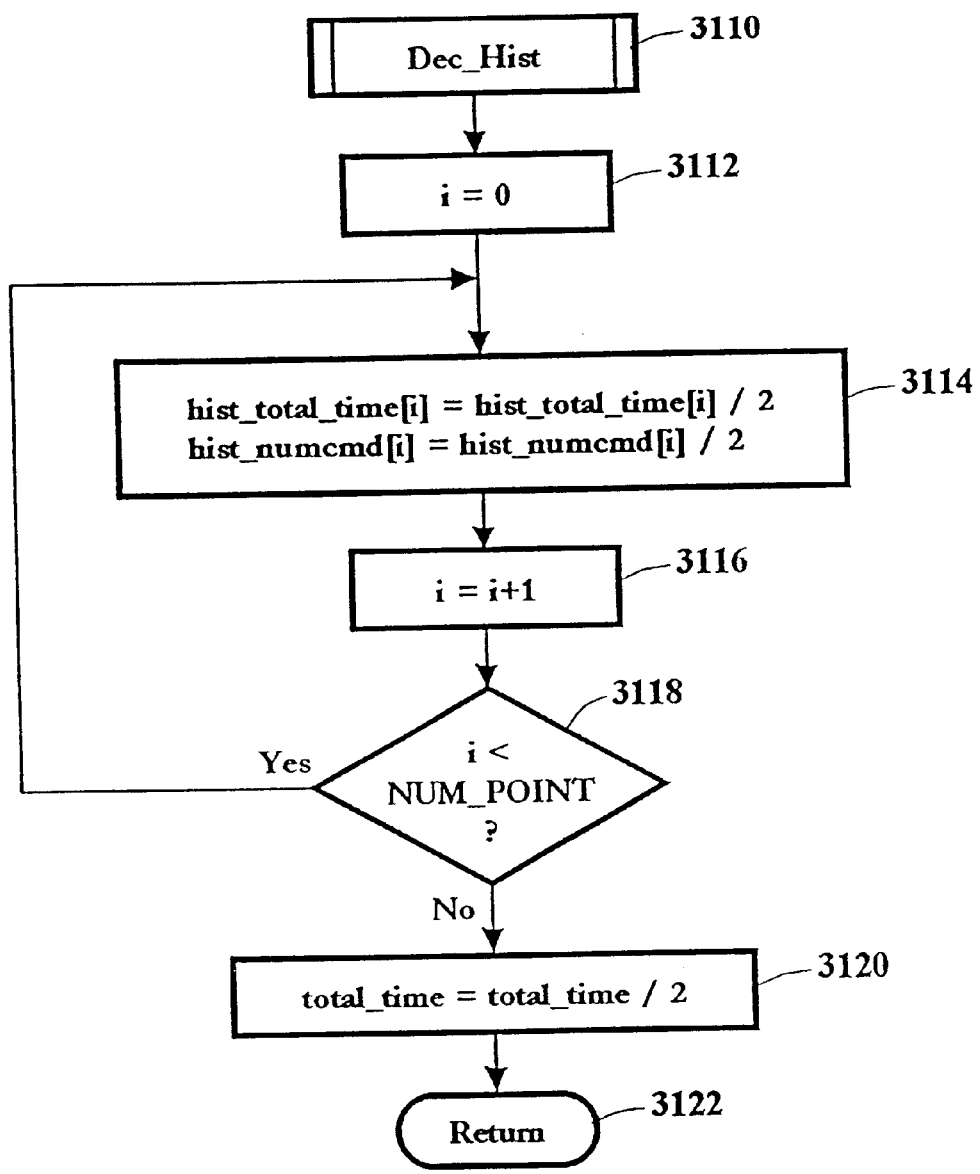
FIG. 31 is a flowchart describing in detail the FIG. 26 subroutine that reduces the influence of the past command access.

FIG. 26 is a flowchart describing in detail the command completing subroutine shown in step 2420 of FIG. 24. Step 2610 determines whether the command completing subroutine has started. If so, in step 2612 the value of the incorporated timer of the MPU in the HDD at that point is set to the completion time of a command (comp_time). In step 2614 it is judged whether or not the total time (total_time) is greater than or equal to a value of MAX_TIME. The MAX_TIME here is a value twice the constant time described in (5), i.e., a value twice the interval during which the influence of the past command access is reduced. In step 2614, when the total time (total_time) is greater than or equal to a value of MAX_TIME, the process advances to step 2616. In step 2616 a subroutine for reducing the influence of the past command access, which will be described later in FIG. 31, is executed and the process returns to step 2614 again. On the other hand, in step 2614, when the total time (total_time) is less than a value of MAX_TIME, the process advances to step 2618. In step 2618 it is judged whether or not the command interval (interval) is greater than or equal to a value of the first time region (hist_min_time[0]). When the command interval (interval) is greater than or equal to a value of the first time region (hist_min_time[0]), the process advances to step 2620. In step 2620 a subroutine for determining when to enter the power saving mode next, which will be described later in FIG. 27, is executed. In step 2622 the subroutine ends. On the other hand, when the command interval (interval) is less than a value of the first time region (hist_min_time[0]), it means that the command interval is shorter than the minimum time until a transition to a power saving mode. As described above, there is no need to hold data, so the process advances to step 2622 and ends the subroutine.

Figure 28:
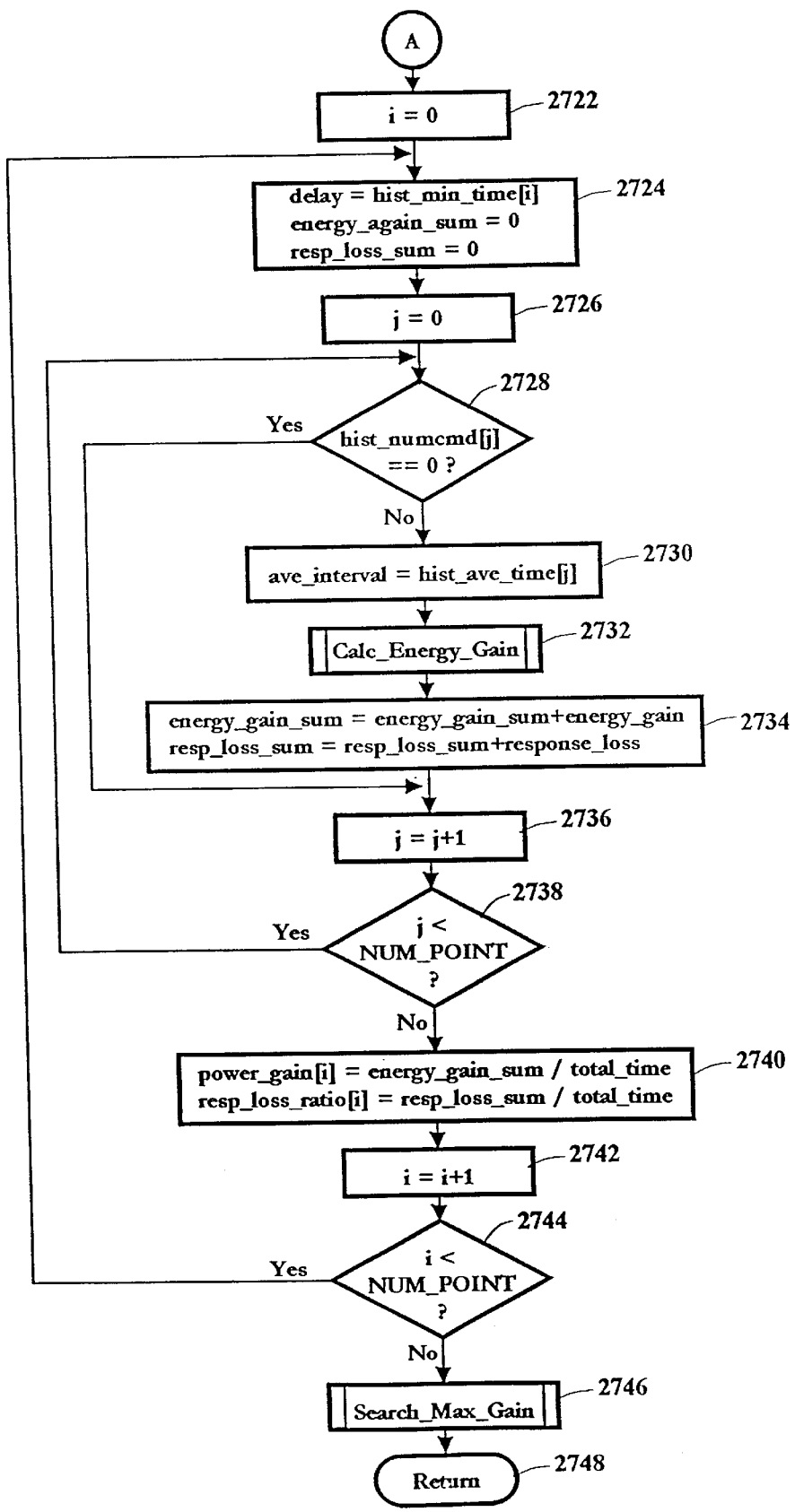
FIG. 28 is a flowchart describing in detail the FIG. 26 subroutine that determines when to enter a power saving mode.

FIGS. 27 and 28 are flowcharts describing in detail the subroutine that determines when to enter the power saving mode next, shown in step 2620 of FIG. 26. In step 2710 if the subroutine for determining when to enter the power saving mode next is started then in step 2712 the value of i is initialized to 0. In step 2714 it is judged whether or not the total number of commands in the $(i+1)^{th}$ time region (hist_numcmd[i]) equals 0. When the value of i equals 0, i.e., when the total number of commands in the $(i+1)^{th}$ time region (hist_numcmd[i]) is 0, the process advances to step 2718. On the other hand, in step 2714, if hist_numcmd[i] is not equal to 0, the process advances to step 2716. In step 2716, the total number of the time intervals of commands in the $(i+1)^{th}$ time region (hist_total_time[i]) is divided by the total number of commands in the $(i+1)^{th}$ time region (hist_numcmd[i]). Let the quotient be hist_ave_time[i]. Therefore, hist_ave_time[i] represents an average command time interval per command in the $(i+1)^{th}$ time region. If the process ends step 2716, it advances to step 2718. In step 2718 the value of i is increased by 1. In step 2720 it is judged whether or not the value of i is less than the number of time regions for command intervals (NUM_POINT). When the value of i is less than the number of time regions for command intervals (NUM_POINT), the process returns to step 2714 again. Until the value of i is greater than the number of time regions for command intervals (NUM_POINT), steps 2714 through 2720 are repeated. On the other hand, in step 2720, when the value of i is not less than the number of time regions for command intervals (NUM_POINT), i.e., when the value of i is greater than the number of time regions for command intervals (NUM_POINT), the process advances to A, which is continued by A in FIG. 28.

Figure 29:
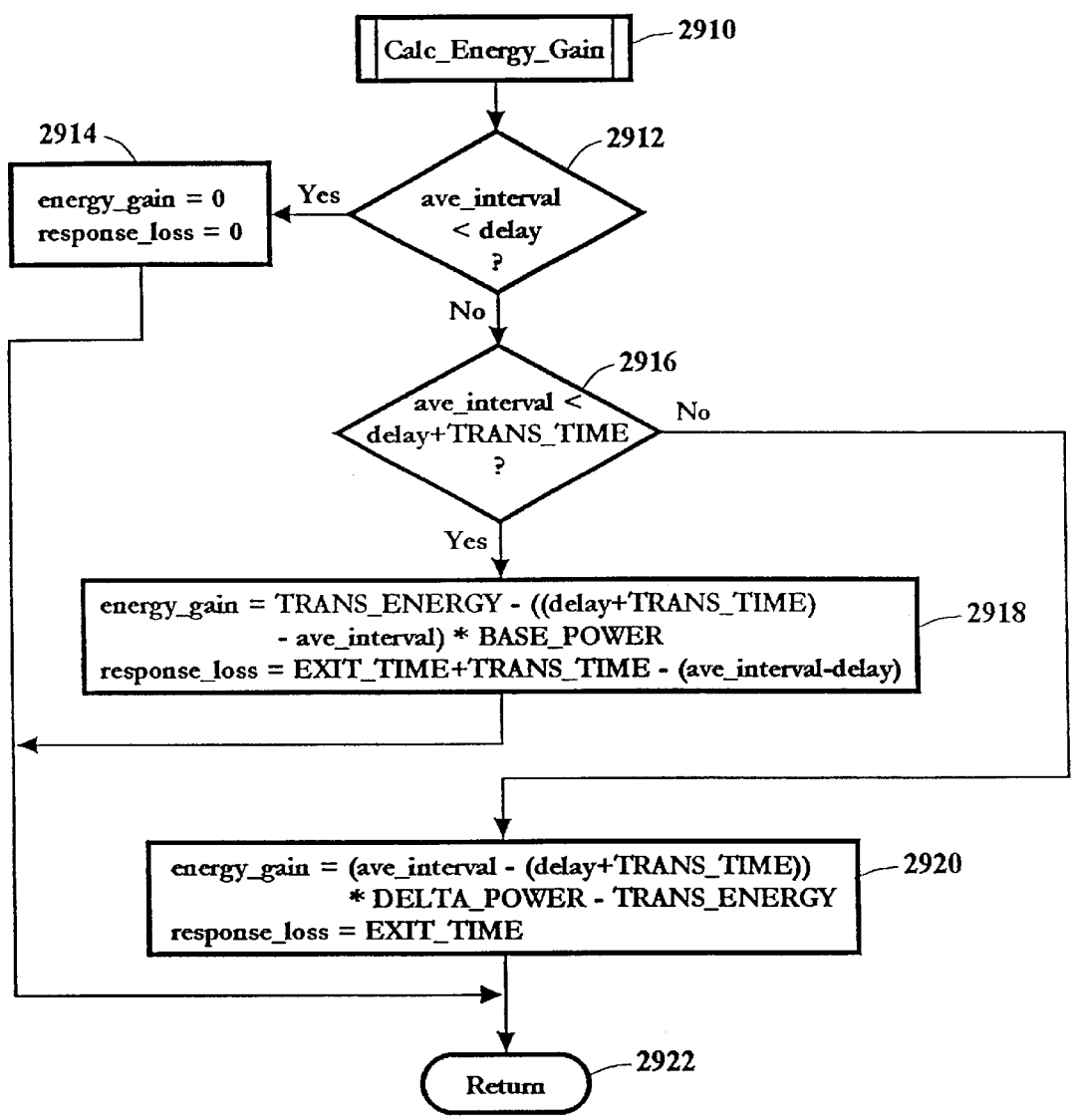
FIG. 29 is a flowchart describing in detail the FIG. 28 subroutine that computes saved energy.

The process advances from A of FIG. 28 to step 2722, in which the value of i is initialized to 0. In step 2724 the value of the first time region (hist_total_time[i]) is stored in a variable (delay). Also, a value of energy_gain_sum, which is savable total energy (electric energy dissipation), and a value of resp_loss_sum, which is the total response delay with respect to commands, are initialized to 0, respectively. In step 2726 the value of j is initialized to 0. In step 2728 it is judged whether or not the total number of commands in the $(j+1)^{th}$ time region (hist_numcmd[j]) equals 0. When the value of hist_numcmd[j] equals 0, i.e., when the total number of commands in the $(j+1)^{th}$ time region is 0, the process advances to step 2736. In step 2736 the value of j is increased by 1. On the other hand, in step 2728, if hist_numcmd[j] is not equal to 0, the process advances to step 2730. In step 2730, let an average command time interval per command in the $(j+1)^{th}$ time region be ave_interval. In step 2732, a subroutine for computing saved energy, which will be described later in FIG. 29, is executed. In step 2734, energy_gain is added to savable total energy (energy_gain_sum) and resp_loss is added to the total response delay with respect to commands (resp_loss_sum). Thereafter, the process advances to step 2736 and the value of j is increased by 1. In step 2738 it is judged whether or not the value of j is less than the number of time regions for command intervals (NUM_POINT). When the value of j is less than NUM_POINT, the process returns to step 2728 again. Until the value of j is greater than NUM_POINT, steps 2728 through 2738 are repeated. On the other hand, in step 2738, when the value of j is greater than the number of time regions for command intervals (NUM_POINT), the process advances to step 2740. In step 2740, energy_gain_sum and resp_loss_sum are respectively divided by total_sum. With this, the savable power dissipation (power_gain[i]) and the response delay ratio (resp_loss_ratio[i]) are calculated. In step 2742 the value of i is increased by 1. In step 2744 it is judged whether or not the value of i is less than the number of time regions for command intervals (NUM_POINT). When the value of i is less than NUM_POINT, the process returns to step 2724 again. Until the value of i is greater than NUM_POINT, steps 2724 through 2744 are repeated. On the other hand, in step 2744, when the value of i is greater than the number of time regions for command intervals (NUM_POINT), the process advances to step 2746. In step 2746, a subroutine is executed to predict the time when the amount of energy saved is maximized. Thereafter, the process advances to step 2748 and ends the subroutine.

FIG. 29 is a flowchart describing in detail the subroutine that computes saved energy, shown in step 2732 of FIG. 28. In step 2910, if the subroutine for computing saved energy is started, in step 2912 it is judged whether or not the value of the ave_interval determined in step 2730 of FIG. 28 is less than the value of the delay determined in step 2724 of FIG. 28. When the value of the ave_interval is less than the value of the delay, an average command time interval per command is shorter than the time until a transition to a power saving mode. Thus, this case corresponds to the fact that in interval A in FIG. 2, the next command comes, and has no influence on the savable total energy (energy_gain_sum) and the total response delay with respect to commands (resp_loss_sum). Therefore, in this case, the process advances to step 2914, sets the values of energy_gain and resp_loss to 0, and ends the subroutine at step 2922. On the other hand, in step 2912, when the value of ave_interval is not less than the value of delay, this case corresponds to the fact that in interval B or C in FIG. 2, the next command comes. The process advances to step 2916. In step 2916 it is judged whether or not the value of ave_interval is less than the sum of the value of delay and TRANS_TIME that is the time required to enter a power saving mode. When the value of ave_interval is less than delay+TRANS_TIME, this case corresponds to the fact that in interval B in FIG. 2, the next command comes. The process advances to step 2918. In step 2918, energy_gain and resp_loss, as described in FIG. 2, are calculated with equations.

$$energy\_gain = -TRANS\_ENERGY - ((delay + TRANS\_TIME) - ave\_interval) * BASE\_POWER \quad (4)$$

$$resp\_loss = EXIT\_TIME + TRANS\_TIME - (ave\_interval - delay) \quad (5)$$

In Equation (4), TRANS_ENERGY is the sum of the energy required for the HDD to enter a power saving mode and return from that mode, and is equivalent to EL1+EL2 in FIG. 2. Also, BASE_POWER is the power dissipation of the HDD in an idle mode. Therefore, the second term on the right-hand side of Equation (4), (delay+TRANS_TIME)−ave_interval)*BASE_POWER, is equivalent to EL3 of Equation (2).

Also, in Equation (5), EXIT_TIME is the time required for the HDD to return from a power saving mode and is equivalent to the time b in FIG. 2. TRANS_TIME is the time required for the HDD to enter a power saving mode and is equivalent to the time a in FIG. 2.

After ending step 2918, the process advances to step 2922 and ends the subroutine.

On the other hand, in step 2916, when the value of ave_interval is not less than delay+TRANS_TIME, this case corresponds to the fact that in interval C in FIG. 2, the next command comes. The process advances to step 2920. In step 2920, energy_gain and resp_loss, as described in FIG. 2, are calculated with equations.

$$energy\_gain = (ave\_interval - (delay + TRANS\_TIME) * DELTA\_POWER - TRANS\_ENERGY \quad (6)$$

$$resp\_loss = EXIT\_TIME \quad (7)$$

Here, DELTA_POWER is the difference between the power dissipation of the HDD in an idle mode and the power dissipation of the HDD in a power saving mode. Therefore, the first term on the right-hand side of Equation (6), (ave_interval−(delay+TRANS_TIME)*DELTA_POWER, is equivalent to EG of Equation (3). After completing step 2920, the process advances to step 2922 and the subroutine ends.

Figure 30:
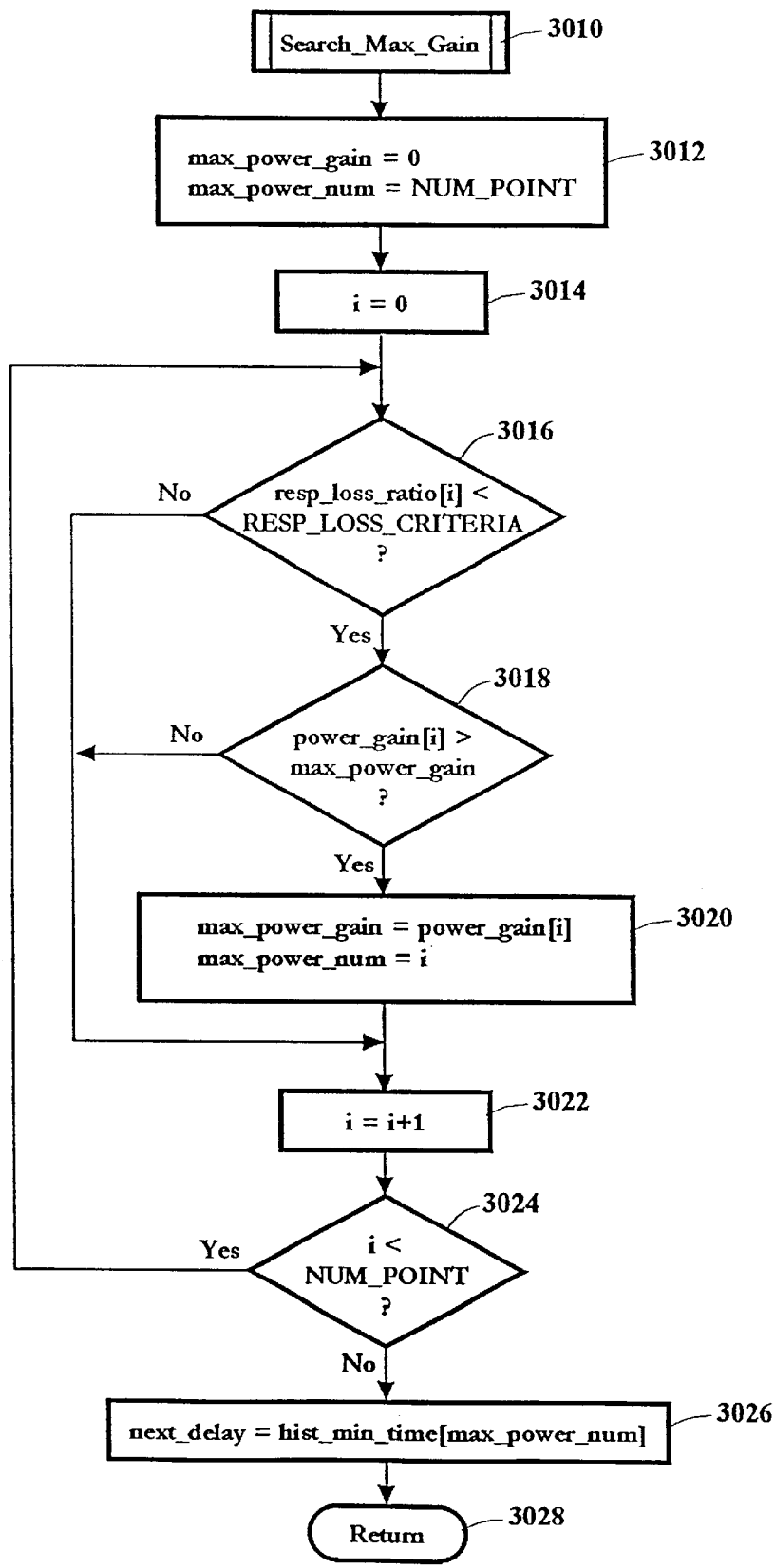
FIG. 30 is a flowchart describing in detail the FIG. 28 subroutine that predicts the time that saved energy is maximized.

FIG. 30 is a flowchart describing in detail the subroutine that predicts the time that saved energy is maximized, shown in step 2746 of FIG. 28. In step 3010, if the subroutine for predicting the time that saved energy is maximized is started, in step 3012 max_power_gain which is the maximum saved electric energy is initialized to 0 and max_power_num is initialized to NUM_POINT. In step 3014, the value of i is initialized to 0 and the process advances to step 3016. In step 3016 it is judged whether or not the value of the response delay ratio (resp_loss_ratio[i]) is less than that of an allowable maximum average delay time (RESP_LOSS_CRITERIA). When the value of resp_loss_ratio[i] is less than that of RESP_LOSS_CRITERIA, a response delay is within an allowable range and the process further advances step 3018. In step 3018 it is judged whether or not power_gain[i] is greater that max_power_gain. On the other hand, when the value of resp_loss_ratio[i] is not less than that of RESP_LOSS_CRITERIA, a response delay is not within an allowable range and the process advances step 3022. In step 3018, when power_gain[i] is greater that max_power_gain, the process advances to step 3020. In step 3020, the value of max_power_gain is updated to the value of power_gain[i], and the value of max_power_num is also updated to the value of i at that time. Thereafter, the process advances to step 3022. On the other hand, in step 3018, when power_gain[i] is not greater that max_power_gain, the values of max_power_gain and max_power_num are not updated and the process advances to step 3022. In step 3022, the value of i is increased by 1. In step 3024 it is judged whether or not the value of i is less than NUM_POINT. When the value of i is less than NUM_POINT, the process returns to step 3016 again. Until the value of i is greater than NUM_POINT, steps 3016 through 3024 are repeated. On the other hand, in step 3024, when the value of i is greater than NUM_POINT, in step 3026 the time until a transition to the next command (next_delay) is set to hist_min_time[max_power_num]. Thereafter, the process advances to step 3028 and ends the subroutine.

FIG. 31 is a flowchart describing in detail the subroutine that reduces the influence of the past command access, shown in step 2616 of FIG. 26. In step 3110, if the subroutine for reducing the influence of the past command access is started, in step 3112 the value of i is initialized to 0. In step 3114, the total number of the time intervals of commands in the (i+1)st time region (hist_total_time[i]) is divided by 2. Let the quotient be hist_total_time[i]. The total number of commands in the (i+1)st time region (hist_numcmd[i]) is divided by 2. Let the quotient be hist_numcmd[i]. In step 3116, the value of i is increased by 1. In step 3118 it is judged whether or not the value of i is less than NUM_POINT. When the value of i is less than NUM_POINT, the process returns to step 3114 again. Until the value of i is greater than NUM_POINT, steps 3114 through 3118 are repeated. On the other hand, in step 3118, when the value of i is greater than NUM_POINT, the process advances to step 3120. In step 3120, total_time is divided by 2. Let the quotient be total_time. Thereafter, the process advances to step 3122 and ends the subroutine.

Figure 32:
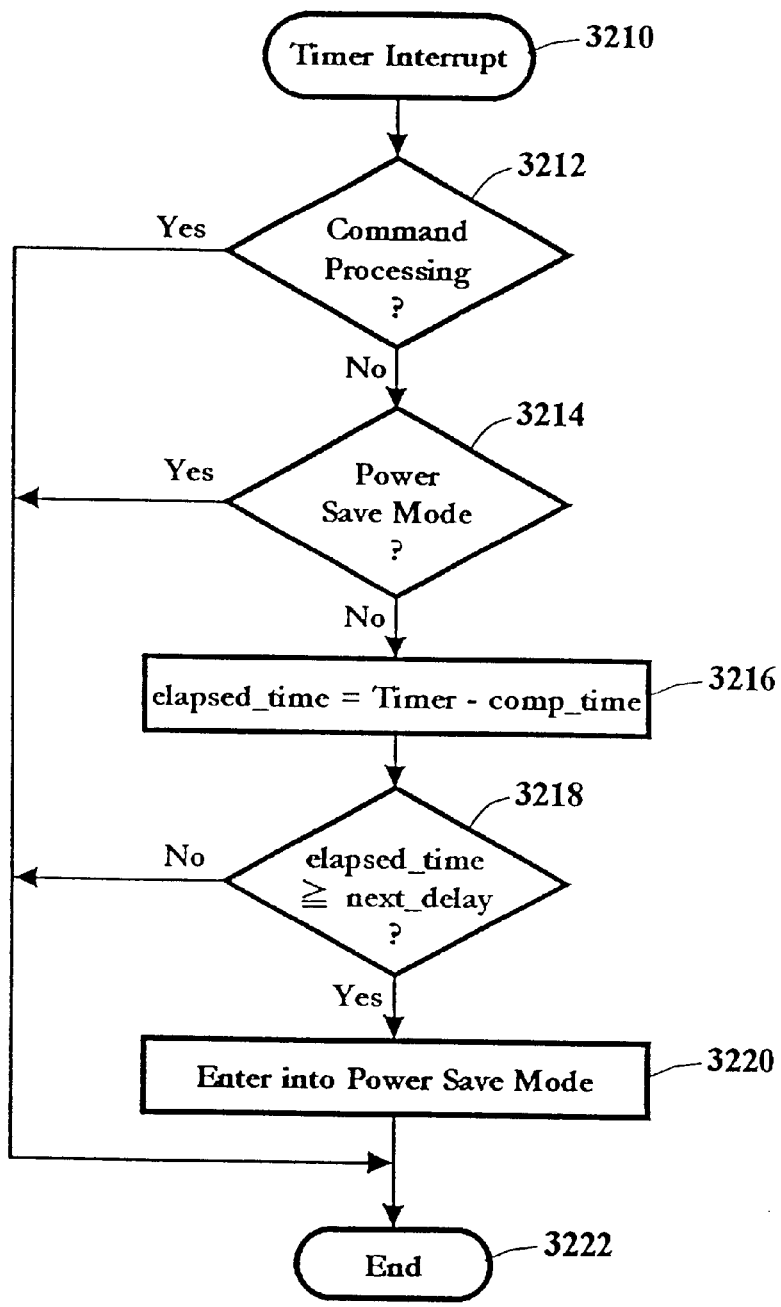
FIG. 32 is a flowchart showing a timer interruption operation for making a transition to a power saving mode.

FIG. 32 is a flowchart showing a timer interruption operation for making a transition to a power saving mode. In step 3210, if a timer interruption program for making a transition to a power saving mode is started, in step 3212 it is judged whether or not the HDD is presently processing a command. If it is processing a command, the program advances to step 3222 and ends. If it is not processing a command, the program advances to step 3214. In step 3214 it is judged whether or not the HDD has presently entered a power saving mode. If it has already entered a power saving mode, the program advances to step 3222 and ends. If it has not entered a power saving mode yet, the program advances to step 3216. In step 3216, the completion time (comp_time) of a command completed just before is subtracted from the incorporated timer of the MPU in the HDD. Let the difference be elapsed_time. Next, the process advances to step 3218, in which it is judged whether or not the value of elapsed_time is greater than the time until a transition to the next power saving mode (next_delay). When the value of elapsed_time is greater than the time until a transition to the next power saving mode (next_delay), the program advances to step 3220. The HDD enters the power saving mode and the program ends at step 3222. On the other end, in step 3218, when the value of elapsed_time is not greater than the time until a transition to the next power saving mode (next_delay), the program advances to step 3222 and ends.

(8) Experimental Results of the Embodiment:

Tables 1 and 2 show experimental results employing an actual HDD. Table 1 shows average power dissipations when the HDD executes one of the benchmark programs for comparing battery hours used, for a case without saving power (No Power Save), a case of employing ABLE2 method, and a case of employing a new method of the present invention, respectively. In Table 1, the microcode controls three power saving modes, employing the ABLE2 method. Even in the new method, three power saving modes are employed. The ABLE Mode in Table 1 is a parameter for controlling the deepest power saving mode that allows a transition. If this number is less, a power saving mode of a deeper level will be allowed. Also, Table 2 shows scores (the higher, the better) when the HDD executes one of the benchmark programs for measuring HDD throughput, for the same cases as Table 1.

TABLE 1

| Method | ABLE | Average | Ratio |
|---|---|---|---|
| No Power Save | N/A | 1796 mW | N/A |
| ABLE2 | 192 | 913 mW | 100.0% |
|  | 128 | 834 mW | 100.0% |
|  | 1 | 705 mW | 100.0% |
| New Method | 192 | 895 mW | 98.0% |
|  | 128 | 806 mW | 96.6% |
|  | 1 | 642 mW | 91.1% |

TABLE 2

| Method | ABLE Mode | Business Ratio | (vs No PS) | High End Ratio | (vs No PS) |
|---|---|---|---|---|---|
| No Power Save | N/A | 771 | 100.0% | 1,790 | 100.0% |
| ABLE2 | 192 | 754 | 97.8% | 1,770 | 98.9% |
|  | 128 | 756 | 98.1% | 1,770 | 98.9% |
|  | 1 | 756 | 98.1% | 1,780 | 99.4% |
| New Method | 192 | 771 | 100.0% | 1,770 | 98.9% |
|  | 128 | 771 | 100.0% | 1,790 | 100.0% |
|  | 1 | 764 | 99.1% | 1,780 | 99.4% |

From the foregoing, it follows that for the average power dissipation in Table 1, the new method according to an embodiment of the present invention is about 9% less in the case of employing the deepest power saving mode than the ABLE2 method.

Also, for the scores in Table 2, this embodiment is about 1% better than the ABLE2 method and nearly equals the case of performing no power savings.

The present invention further reduces the power dissipation of an HDD.

The present invention further reduces the power dissipation of an HDD. In addition, according to the present invention, a method and a system, capable of computing the electric energy dissipation that is expected to be saved when a transition to a power saving mode is made, can be provided.

Furthermore, the present invention can provide a method and a system that calculate the density of commands that an HDD receives from a host computer truly in accordance with the non-operating time of the HDD, while overcoming drawbacks of the prior art that, although the non-operating time of the HDD is short, the apparent density of commands received from the host computer is reduced and therefore a transition to a power saving mode is made at improper timing. While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of reducing power that is dissipated by a device capable of making a transition between a first state and a second state in which said device dissipates less power than in said first state, comprising:

computing a predicted amount of power that would be saved by said device if said device makes a transition from said first state to said second state;

computing a time at which said device should transition from said first state to said second state, using at least one predicted amount of power to be saved; and, transitioning said device from said first state to said second state, wherein said computing a time at which said device should transition from said first state to said second state further comprises:

computing a distribution of past command intervals;

computing a response delay time with respect to a next command using said distribution of past command intervals; and, computing a time at which said device should transition from said first state to said second state using said response delay time with respect to the next command.

2. A data storage device capable of making a transition between a first state and a second state in which said data storage device dissipates less power in said second state than said first state, comprising:

a recording medium;

a motor to move said recording medium;

a controller to control said motor wherein said controller:

computes a predicted amount of power that would be saved by said data storage device if said data storage device makes a transition from said first state to said second state;

computes a time at which said data storage device should transition from said first state to said second state, using at least one predicted amount of power to be saved; and, outputs signals to transition said data storage device from said first state to said second state, wherein said controller, in computing a time at which said data storage device should transition from said first state to said second state:

computes a distribution of past command intervals;

computes a response delay time with respect to a next command using said distribution of past command intervals; and, computes a time at which said data storage device should transition from said first state to said second state using said response delay time with respect to the next command.

* * * * *